United States Patent
Szarvas et al.

(10) Patent No.: US 10,909,442 B1
(45) Date of Patent: Feb. 2, 2021

(54) NEURAL NETWORK-BASED ARTIFICIAL INTELLIGENCE SYSTEM FOR CONTENT-BASED RECOMMENDATIONS USING MULTI-PERSPECTIVE LEARNED DESCRIPTORS

(71) Applicant: Amazon Technologies, Inc., Seattle, WA (US)

(72) Inventors: Gyuri Szarvas, Berlin (DE); Alex Klementiev, Berlin (DE); Lea Frermann, Edinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 980 days.

(21) Appl. No.: 15/474,992

(22) Filed: Mar. 30, 2017

(51) Int. Cl.
*G06N 3/04* (2006.01)
*G06N 3/08* (2006.01)

(52) U.S. Cl.
CPC .............. *G06N 3/04* (2013.01); *G06N 3/08* (2013.01)

(58) Field of Classification Search
CPC .................................. G06N 3/04; G06N 3/08
See application file for complete search history.

(56) References Cited

U.S. PATENT DOCUMENTS

| | | |
|---|---|---|
| 6,266,649 B1 | 7/2001 | Linden et al. |
| 6,782,370 B1 | 8/2004 | Stack |
| 7,908,183 B2 | 3/2011 | Jacobi et al. |
| 8,510,247 B1 | 8/2013 | Kane, Jr. et al. |
| 2015/0242492 A1* | 8/2015 | Bhatt ............... G06F 16/951 707/748 |
| 2016/0253392 A1* | 9/2016 | Allen ............... G06F 16/285 707/740 |
| 2018/0107645 A1* | 4/2018 | Payne ............... G06F 16/9536 |

OTHER PUBLICATIONS

Smekens, "Clarify Purpose versus Point of View versus Perspective", 2015 (Year: 2015).*
Diederik P. Kingma and Jimmy Lei Ba, "ADAM: A Method for Stochastic Optimization," Published as a conference paper at ICLR 2015, Jul. 23, 2015, pp. 1-15.

(Continued)

*Primary Examiner* — Li B. Zhen
*Assistant Examiner* — Selene A. Haedi
(74) *Attorney, Agent, or Firm* — Robert C. Kowert; Kowert, Hood, Munyon, Rankin & Goetzel, P.C.

(57) ABSTRACT

At a network-accessible artificial intelligence service for generating content-based recommendations based on multi-perspective learned descriptors, text sections associated with a plurality of description perspectives, including a single-character perspective and a multi-character perspective, are extracted from various text sources. Using the text sections as input, a machine learning model which includes respective portions corresponding to the different perspectives is trained to reconstruct the input using intermediary descriptors learned from the input. An indication that a second text source is recommended with respect to a first text source is generated using a set of the learned descriptors and transmitted.

20 Claims, 11 Drawing Sheets

(56) References Cited

OTHER PUBLICATIONS

David Bamman, Ted Underwood and Noah A. Smith, "A Bayesian Mixed Effects Model of Literary Character," Proceedings of the 52nd Annual Meeting of the Association for Computational Linguistics, pp. 370-379, Baltimore, Maryland, USA, Jun. 23-25, 2014. c2014 Association for Computational Linguistics.

David Bamman, Brendan O'Connor and Noah A. Smith, "Learning Latent Personas of Film Characters," Proceedings of the 51st Annual Meeting of the Association for Computational Linguistics, pp. 352-361, Sofia, Bulgaria, Aug. 4-9, 2013. c2013 Association for Computational Linguistics.

David Bamman and Noah A. Smith, "Unsupervised Discovery of Biographical Structure from Text," http://dumps.wikimedia.org/enwiki/20140102/enwiki-20140102-pages-articles.xml.bz2, 2014, pp. 1-13.

Micha Elsner, "Character-based Kernels for Novelistic Plot Structure," Proceedings of the 13th Conference of the European Chapter of the Association for Computational Linguistics, pp. 634-644, Avignon, France, Apr. 23-27, 2012. c2012 Association for Computational Linguistics.

Yaroslav Ganin and Victor Lempitsky, "Unsupervised Domain Adaptation by Backpropagation," Proceedings of the 32nd International Conference on Machine Learning, Lille, France, 2015. JMLR: W&CP vol. 37. Copyright 2015 by the author(s), pp. 1-10.

Jeffrey Pennington, Richard Socher and Christopher D. Manning, "GloVe: Global Vectors for Word Representation," Oct. 25, 2014, pp. 1-12.

Mohit Iyyer, Anupam Guha, Snigdha Chaturvedi, Jordan Boyd-Graber, and Hal Daum'e III, "Feuding Families and Former Friends: Unsupervised Learning for Dynamic Fictional Relationships," 2016, pp. 10-11.

David M. Blei, Department of Computer Science Princeton University"Probabilistic Topic Models," Aug. 22, 2011, pp. 1-176.

Yoav Goldberg, "A Primer on Neural Network Models for Natural Language Processing," Draft as of Oct. 5, 2015, Journal of Artificial Intelligence Research 57 (2016) pp. 345-420.

Diego Marcheggiani and Ivan Titov, "Discrete-State Variational Autoencoders for Joint Discovery and Factorization of Relations," Transactions of the Association for Computational Linguistics, vol. 4, pp. 231-244, 2016. Action Editor: Sebastian Riedel Submission batch: Oct. 2015; Revision batch: Feb. 2016; Published Jun. 2016. 2016 Association for Computational Linguistics. Distributed under a CC-BY 4.0 license.

U.S. Appl. No. 14/581,555, filed Dec. 23, 2014, Wainwright Gregory Siady Yu.

U.S. Appl. No. 14/581,546, filed Dec. 23, 2014, Wainwright Gregory Siady Yu.

* cited by examiner

NEURAL NETWORK-BASED ARTIFICIAL INTELLIGENCE SYSTEM FOR CONTENT-BASED RECOMMENDATIONS USING MULTI-PERSPECTIVE LEARNED DESCRIPTORS

BACKGROUND

Many content providers, such as e-retail organizations or libraries which sell or lend content items such as books, periodicals and the like, may have large inventories comprising millions of items. From several points of view, such as those of the organizations distributing the content, the producers of the content (e.g., authors or publishers) as well as the consumers of the content, the ability to generate meaningful recommendations to the consumers—e.g. a suggestion that a reader might enjoy reading books B2, B3 or B4 if the reader has enjoyed reading book B1—may be quite useful.

Unfortunately, many commonly-used approaches towards recommendations may not always work very well, especially with respect to the "long tail" of content items, where large numbers of individual content items may have relatively few consumers per item. Using best-seller information or other overall popularity information for recommendations may tend to concentrate the attention of consumers towards a small subset of items, potentially leaving many high-quality but less-publicized items with lower sales than may have been achieved if their quality had been recognized.

Some recommendation systems may attempt to classify the content consumers into groups, based for example on the items borrowed or purchased, or based on demographic factors, and then recommend items which appear to have been successful with some members of a given group to other members of the same group or similar groups. However, despite attempts at fairly fine-grained classification of content consumers, the rate of new item content generation may often be so great that such approaches may also tend to miss opportunities for recommending high-quality content that fails to reach a threshold of popularity quickly enough. Furthermore, even when such systems do provide useful recommendations, they may not be able to provide convincing or easy-to-understand justifications for those recommendations.

Figure 1:
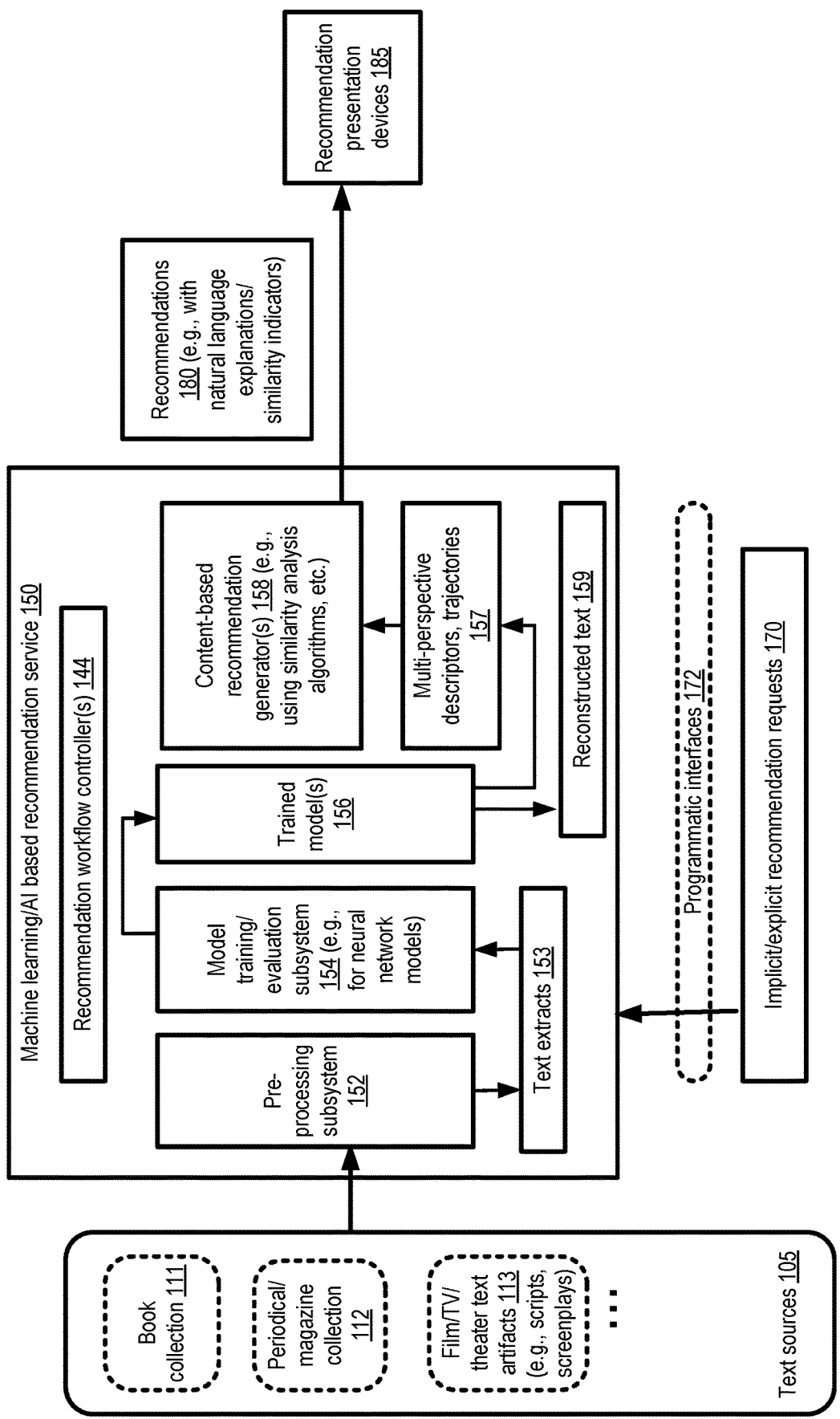
FIG. 1 illustrates an example system environment in which recommendations for content items may be generated using machine learning models which utilize induced descriptors associated with a plurality of content description perspectives to reconstruct text sequences, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing interpretable content-based recommendations with respect to a variety of content sources (such as books) using low-dimension descriptors associated with multiple description perspectives are described. In at least some embodiments, a pipeline or workflow of machine learning tasks, e.g., involving the use of one or more neural network-based models, may be employed to generate the recommendations. In much of the following description, books which include mentions of multiple characters are used as the primary examples with respect to which recommendations are generated. It is noted that in various embodiments techniques similar to those described herein may be used with similar success to generate recommendations for other types of content, such as non-fiction books, articles in magazines or periodicals, television programs, motion pictures and the like, or to generate recommendations across content types (e.g., recommendations for a film may be generated based on a reader's liking of a particular book or television program).

In various embodiments, the workflow of generating recommendations with respect to a given book or a set of books may include identifying several different content description perspectives with respect to which the books are to be characterized. In some embodiments, such perspectives may include, for example, single-character perspectives (in which the evolution, as the book progresses from its beginning to its conclusion, of individual characters considered singly are examined), multi-character perspectives (in which changes in relationships among two or more characters may be examined), location perspectives (in which the changes to the locations in which events occur in the books are considered) and so on. Corresponding to each of the content description perspectives selected, text sections from the books may be extracted in at least some embodiments—e.g., sequences of W words (where W is a meta-parameter) which include mentions of only one character may be extracted for single-character perspectives, sequences which include mentions of exactly two characters may be extracted for two-character perspectives, sequences which mention place names or scene changes may be extracted for location perspectives, and so on. Multiple sections of text for a given perspective (and for each of several different sets of one or more characters if the perspective involves characters) may be obtained from a given book in various embodiments, and such extractions may be performed on each book of a collection of books from among which recommendations are to be generated in at least some embodiments. The book text portions corresponding to the different perspectives may be referred to in various embodiments as text "sections", "extracts", "sequences" or "spans".

Using at least some of the text sections as input, in at least some embodiments, a neural network model may be trained. In some embodiments, the neural network model may comprise respective portions focused on learning about the different perspectives: e.g., one or more sub-networks comprising some number of nodes or artificial neurons may be associated primarily with a single-character perspective, one or more sub-networks may be associated primarily with a multi-character perspective, and so on. In various embodiments, for a given text section, one portion of the neural network model may generate one or more low-dimension descriptors or representations corresponding at least to the perspective associated with the text section. In at least some embodiments, a given descriptor may represent a point in a multi-dimensional word space or embedding, where the number of dimensions may represent a meta-parameter of the model. Such descriptors may be referred to as "induced" descriptors in at least some embodiments.

In some embodiments, another portion of the model may use the induced descriptors as input, and attempt to reconstruct the original text sections from which the descriptors were obtained. As such, in such embodiments the model as a whole may comprise at least two primary logical phases or stages: a descriptor construction stage in which input text is in effect transformed into low-dimensional vectors or descriptors, and a reconstruction stage in which the input is reproduced from the descriptors, with the accuracy of the reproduction serving as a measure of how well the information about the text was captured in the descriptors with respect to the different perspectives being considered. An objective function which takes into account several different factors regarding the accuracy (or inaccuracy) of the reconstructions may be used to train the neural network model in some embodiments. For example, in one embodiment, the model may be trained using a selected objective function to (a) reproduce, to a high level of accuracy, at the model portion designated for a given perspective, text sections representing that same perspective and (b) reproduce, to a low level of accuracy, at the model portion designated for the given perspective, text sections representing a different perspective. In effect, in such embodiments, for a given content description perspective, the intermediate descriptors may be intended to capture information that can be used to characterize the book accurately from that given perspective, while avoiding the inclusion of information which is not particularly relevant to that perspective. In at least some embodiments, "negative" or "fake" text sections (e.g., sequences of text which appear to meet the definition or criteria for the perspective being considered, but are not actually from the text source being analyzed) may also be used during training, and terms associated with such synthetic text sections may also be included in objective functions as discussed below in further detail.

The descriptors associated with the various perspectives may be captured and stored in various embodiments. Within any given book, for a given character-based perspective (such as a single-character perspective or a two-character perspective), a trajectory or sequence of descriptors associated with a given character or a set of characters may be identified in at least some embodiments. For example, the state of a given character C1 in Chapter I of a book may be represented by a descriptor D1, the state of C1 in Chapter II may be represented by D2, the state of C1 in Chapter IV may be represented by D3, and so on. With respect to non-character based perspectives, similar trajectories may be identified as well in at least some embodiments. For a given book B1, a collection of descriptor trajectories {T1} may be identified and stored in some embodiments; similarly, for another book B2, a different collection of descriptor trajectories {T2} may be identified and stored, and for a third book B3, a third set of descriptor trajectories {T3} may be generated and stored. Using such trajectory sets, in at least some embodiments, similarities among the different books' content may be identified, e.g., using various types of similarity analysis algorithms such as clustering algorithms or nearest-neighbor identification algorithms. For example, the similarity analysis may comprise determining a distance between a point representing a particular learned descriptor in vector space and another point in the vector space, wherein the other descriptor represents a particular word from a pre-selected dictionary of words. Such similarities may then be used to generate one or more recommendations with respect to a given book—e.g., if {T1} is similar to {T2} but very different from {T3} based on the comparison of the trajectories associated with one or more perspectives, then a recommendation to read B2 may be provided to a reader who enjoyed B1 (and a recommendation to read B3 may be avoided for such a reader). The recommendations (and/or associated metadata such as explanations of the kind discussed below) may be provided via programmatic interfaces to various recommendation requesters or targets in different embodiments. In embodiments in which individual descriptors represent a point in a vector space of words (often with a relatively small vector size such as a few dozen), the nearest neighbor words of a given descriptor associated with a given perspective may be identified to help produce a natural language version (or at least a version understandable by humans) of the information contained in the descriptor.

In at least some embodiments, the recommendations produced using a technique such as that described above may be deemed "interpretable" in that in addition to the recommendations themselves, easy-to-understand explanations of the recommendations may also be generated and provided to the recommendation consumers. Such explanations may be framed for example in terms of similarities with other books with respect to development of individual characters, relationship changes over time among characters, and various other content-dependent characteristics corresponding to one or more of the perspectives which were used to characterize the books. Such content-based explanations or similarity indicators may, at least in some embodiments, prove to be more convincing than some other types of recommendations based on classifying the consumers of the books. Furthermore, in various embodiments, the recommendations and associated explanations may be generated for newly-created text sources which may not yet have attained a substantial audience; for example, for a given book B1, recommendations based on the techniques described herein may be generated as soon as the book is published or becomes available, regardless of whether a substantial reader base has already accumulated for the book.

In various embodiments, the results of other efforts to characterize a set of books (or customer preferences regarding books) may be used to evaluate a neural network model of the type described above. For example, a corpus of books may already have been grouped into genres such as "mystery", "horror", "science fiction" and the like. In at least one embodiment, a clustering algorithm or an algorithm such as K-nearest neighbors may be used on the descriptors or trajectories produced by the neural network model to determine whether books that were designated as being similar to one another by the earlier classification approach are also found to be similar by the neural network model or not.

A number of different training approaches may be used with respect to the neural network model in different embodiments. In some embodiments, the sequence in which text sections representing the different perspectives being considered are fed to the model as input may be interleaved. For example, if A represents a training record corresponding to a single-character perspective and B represents a training record corresponding to a two-character perspective, and those are the two perspectives being considered, a sequence similar to ABABABAB . . . may be used, in which pairs of inputs representing one perspective are separated by an input representing the other perspective. In a different approach employed in some embodiments, which may be referred to as a staged training approach rather than interleaved training, the model may be trained on a plurality of inputs representing one type of perspective (e.g., all the inputs available for that perspective), and then on a plurality of inputs representing another type of perspective. Using the AB notation introduced above, this second type of training may be represented by the following training input sequence: AAAAA . . . ABBBBB . . . B. In some embodiments in which staged training is used, descriptors or parameters learned during one stage (corresponding to one perspective) may be fixed and passed on for use during the subsequent stage(s). E.g. if the first stage of training corresponds to the single-character perspective and the second stage corresponds to the two-character perspective, a set of single-character descriptors $\{S_{sc}\}$ learned during the first stage may in effect be provided to the second stage of training as constants, a set of two-character descriptors $\{S_{tc}\}$ may be learned in the second stage and used along with $\{S_{sc}\}$ to reconstruct inputs, and so on.

Variants of these two basic approaches may be used in some embodiments, such as a sequence in which two or three inputs of the same perspective may be fed to the model at a time (such as AABBAABB . . . or AAABBBAA-ABBB . . . ). In some embodiments, different objective functions may be employed for respective training approaches—e.g., the objective function used for the ABA-BABAB interleaved training may not be the same as the objective function used for the AAAAABBBBB staged training. In some embodiments in which staged training is used, the order in which inputs representing the different perspectives are used during training may be selected based at least on semantics associated with the perspectives. For example, in one embodiment the perspectives may be arranged in increasing order of specificity or detail, with the most general perspective (such as a location perspective or event perspective) being considered first, somewhat more specific perspectives (such as a single-character perspective) being considered next, and the most specific perspective (such as a multi-character perspective) being used last.

In some embodiments, the neural network model may be trained at one or more servers with substantial computational capabilities, e.g., using physical and/or virtual execution platforms of a computing service of a provider network or public cloud environment. Once the model has been trained, it may be executable using lower levels of computational power and/or memory in various embodiments. Consequently, in at least some embodiments, recommendations may be generated using the trained model at a variety of lightweight or low-power devices, such as a portable computing device, a cell phone, an e-reader device, or a voice-driven automated personal assistant device, in addition to or instead of being generated at more powerful execution platforms similar to those used for training.

Example System Environment

FIG. 1 illustrates an example system environment in which recommendations for content items may be generated using machine learning models which utilize induced descriptors associated with a plurality of content description perspectives to reconstruct text sequences, according to at least some embodiments. As shown, system 100 may include a machine learning and/or artificial intelligence (AI) based recommendation service 150 in the depicted embodiment. The recommendation service may comprise a set of computing devices in various embodiments e.g., including various types of physical and/or virtual servers, memory and storage devices, networking devices and the like. A number of text sources 105, such as book collections 111, periodical or magazine collection 112, as well as various text artifacts 113 associated with or derived from other forms of media such as film, television, theater etc. may represent the set of entities or items for which content-based recommendations are to be generated in the depicted embodiment. Text sources may also be referred to as content items in at least some embodiments. A given recommendation generated by service 150 may indicate, for example, that a consumer who enjoyed a particular book B1 of a book collection 111 may also enjoy another book B2 of the collection, or may also enjoy another content item CI1 from one of the other types of text sources (e.g., a periodical, a television show, a film, etc.). In some cases at least some of the content of an item for which recommendations are to be generated may not necessarily be available in written text format; instead, for example, the original content may be in audio format, video format or the like, and may be converted at least in part to text format, e.g., as part of the work performed at a preprocessing subsystem 152 of the recommendation service.

A number of perspectives with respect to which the content of various items is to be characterized for the purposes of recommendation generation may be identified in various embodiments, e.g., by a recommendation workflow controller 144 of the service 150. Such perspectives may include, for example, a single-character perspective (in which the state of individual characters, considered independently, within the text sources is of primary interest), a two-character perspective (in which the state of relationships between pairs of characters mentioned in the text sources is of primary interest), multi-character perspectives involving more than two characters, event perspectives (in which various types of events which occur in the text sources are of primary interest), location perspectives (in which scene changes within the text sources are of primary interest), temporal perspectives (in which the historical age or period discussed in the text sources are of primary interest) and so on. The set of perspectives to be used for generating the recommendations may be selected, for example, based on the types of content items being considered—e.g., if recommendations for non-fiction items are to be generated, a greater emphasis may sometimes be placed on perspectives associated with facts (e.g., temporal or location related perspectives) than on perspectives associated with human interactions, emotions or relationships.

A plurality of text extracts 153 associated with each of the selected perspectives may be obtained from the text sources 105 in the depicted embodiment, e.g., by the pre-processing subsystem 152. A given text extract may comprise, for example, some number of consecutive words (where the number is a meta-parameter or hyper-parameter of the recommendation generation workflow) which contain a mention of exactly one character (in the case of a single-character perspective), mentions of exactly two characters (in the case of the two-character perspective), mentions of location or scene changes (in the case of the location perspective) and so on. With respect to a given perspective, numerous text extracts may be obtained from a given text source such as a book, and numerous text sources may be analyzed or mined to obtain the extracts. For a given character or a given group of characters, the extracts obtained from different offsets within a given text source may represent an evolution of the character or group as the text source progresses towards its conclusion. For example, a given pair of characters C1 and C2 may meet each other at the start of a book, become friendly at some later stage of the book, and eventually begin to dislike one another towards the end of the book, and the evolution or trajectory of the relationship may be captured by a set of text obtained from various chapters of the book. In at least some embodiments, information about the relative position or offset of a given text extract 153 within its parent text source may be stored as part of the metadata associated with the extract.

One or more machine learning models may be trained using some number of text extracts 153 as part of the training data set in the depicted embodiment. In various embodiments, as part of the pre-processing operations, the identities of individual characters may be stripped or obfuscated from the text input—for example, while the input may indicate that each extract of a given set of two-character extracts is about the same pair of characters, the actual names of the characters may not necessarily be retained. In at least some embodiments, model training and evaluation subsystem 154 may be responsible for generating one or more trained neural network models 156 using the text extracts and/or additional inputs such as a set of pre-learned word vector embeddings corresponding to a dictionary. In one embodiment, a set of pre-learned vectors made available by a third party, such as GloVe (global vectors for word representation) may be used, or a set of embeddings learned internally at the organization at which the recommendation service 150 is implemented may be used. The neural network model may generate, corresponding to various input text extracts associated with the selected perspectives, respective learned or induced descriptors in the depicted embodiment, and then use the descriptors to generated reconstructions 157 of the input text extracts. In at least some implementations, a given descriptor generated by the model may represent a point within a relatively low-dimensional space of words (e.g., the vector space associated with the pre-learned word vectors). A set of N words (where N may represent another meta-parameter) which are the nearest neighbors of the descriptor within the vector space may be used to characterize a given descriptor in human-understandable form in some embodiments. In one embodiment, from a set of N nearest-neighbor words, a summary word or phrase which can serve as a meaningful label for a descriptor may also be generated at the service 150, either automatically based on semantic analysis tools or with the help of linguistics professionals. Examples of descriptor contents and associated labels are discussed below, e.g., in the context of FIG. 4.

In effect, in the depicted embodiment, the neural network model may be trained to generate low-dimensional descriptors which are able to capture, with respect to various perspectives being considered, sufficient information regarding the input text extracts that the input extracts can be reproduced, with a reasonable degree of accuracy, using the descriptors alone. The use of multiple perspectives may result in the capture of complementary or orthogonal types of information in various embodiments—e.g., the kinds of information captured about a two-character relationship in the descriptors derived from two-character text extracts may be independent of the kinds of information captured about a single character in the descriptors derived from the single-character extracts. In at least some embodiments, respective portions of the overall neural network model may be associated primarily with respective perspectives—e.g., a first set of parameters may be learned using a first set of artificial neurons or nodes to generate descriptors and reconstruct text associated with a single-character perspective, while a second set of parameters may be learned using a second set of nodes to generate descriptors and reconstruct text associated with a two-character perspective, and so on.

With respect to a given text source such as a book of collection 111 and a given perspective, a plurality of descriptors may be generated in the depicted embodiment using a trained model, based on respective input extracts. In the case of a perspective involving one or more characters, a plurality of descriptors may be induced for a given set of characters—e.g., one set of descriptors may be generated for character C1 alone, another set for character C2 alone, and so on for a single-character perspective. If the set of generated descriptors pertaining to a given combination of {book, perspective, character set} is arranged in the order of the occurrences of the corresponding input text extracts, the order may represent the trajectory or evolution, with respect to the book being considered, of the information being captured by the descriptors in the depicted embodiment. Corresponding to different books and/or other text sources, respective trajectories may be identified for various perspectives. In at least some embodiments, pairs of text sources (such as a pair of books B1 and B2) may be compared with one another using the descriptor trajectories generated from the books (and/or using individual descriptors generated from the books). If the trajectories or descriptors for two text sources are similar, this may be interpreted in various embodiment as an indication that the content of the two text sources is semantically more likely to be similar than if the trajectories or descriptors are dissimilar. In effect, the problem of detecting semantic similarities between potentially long (and therefore, from an information representation perspective, high-dimension) text sources may be transformed at the recommendation service 150 in at least some embodiments to the simpler problem of finding similarities between relatively low-dimension descriptors (or between sequences of such descriptors) induced from text extracts. Furthermore, because descriptors may be mapped to small sets of words (e.g., using nearest neighbor analysis or other distance-based analysis within the word vector space in which descriptors correspond to respective points), relatively easy-to-understand justifications or explanations for predicted similarities or dissimilarities may be generated in at least some embodiments.

The quality of the mappings between the input text and the descriptors may be evaluated based on the accuracy of the reconstructed text 159 during training of a model 156, e.g., using objective functions of the kinds discussed below in various embodiments. After a model 156 has been trained to a satisfactory level with regard to its ability to reproduce input text, it may be used to generate descriptors for text sources that were not part of the training data, and such descriptors may be compared with the descriptors already generated for other text sources to identify text sources that are good candidates for recommendations in at least some embodiments. In at least some embodiments, recommendations may be generated for pairs of text sources that were both part of the training data set as well—that is, recommendations need not be generated only with respect to pairs of text sources of which at least one text source was not used for training.

Using descriptor and/or trajectory comparisons for various pairs of text sources generated using trained models 156, as well as some information about the preferences of an entity for whom recommendations are to be generated, recommendations 180 with accompanying explanations or similarity indicators/descriptions may be produced at recommendation generators 158 in the depicted embodiment. Consider a scenario in which a recommendation request 170 received via programmatic interfaces 172 of the recommendation service 150 indicates that a particular reader has enjoyed book B1. The reader for whom the recommendation is to be generated may be referred to as the recommendation target in at least some embodiments. If B1 has already been analyzed by the recommendation service 150, e.g., if descriptors with respect to various perspectives have already been produced for B1, other books or text sources similar to B1 may be identified from among the pre-analyzed text sources, e.g., using similarity analysis algorithms such as clustering or nearest-neighbor algorithms at the recommendation generator 158. If B1 has not already been analyzed, text extracts may be obtained from B1, descriptors may be induced or learned from those text extracts, and then text sources similar to B1 may be identified using the newly-generated descriptors in the depicted embodiment. A recommendation 180 may be generated for the target, indicating one or more of the test sources that were found based on descriptor analysis to be similar to B1 in the depicted embodiment.

In at least some embodiments, a recommendation request 170 may indicate not only that a reader liked a text source, but also why the reader liked the text source—e.g., because of the nature of the relationship between a pair of characters, because of the historical era in which the book was set, etc. In such embodiments, the reasoning behind the positive experience with a text source may be used at the recommendation service to identify better recommendations— e.g., respective weights may be assigned to different content description perspectives during the similarity analysis and adjusted relative to one another based on the reasoning information. In some embodiments, information about dislikes of text sources may be used, e.g., instead of or in addition to information about the preferences of the recommendation target. If, for example, a reader indicates a strong dislike for a particular book B2, the recommendation system may be able to identify one or more other text sources that are very different from B2, and recommend such text sources in at least some embodiments.

A number of different programmatic interfaces 172 may be supported for the submission of recommendation requests 170 and/or other interactions such as requests to train the models which generate the induced descriptors, requests to provide human-readable representations of the descriptors or trajectories, and so on. The interfaces 172 may include, for example, web-based consoles, application programming interfaces (APIs), command-line tools, and/or graphical user interfaces in various embodiments. In some embodiments, the generation of recommendations may be triggered by implicit rather than explicit recommendation requests. For example, a reader may not necessarily submit a recommendation request after reading a book that the reader enjoyed. Instead, in at least some embodiments, various secondary pieces of data, such as the fact that a reader finished a book, the time it took the reader to finish a book, or the set of books that a reader has read recently, may be assumed to indirectly indicate that the reader liked the book. Such secondary data may be available in at least some embodiments to the organization which sells or distributes the text sources— e.g., if an electronic reader device is being used by the reader and the reader is willing to share information about their reading history. In such embodiments, various actions such as the completion of reading of a text source may trigger the production of recommendations, and such actions may be considered examples of indirect recommendation requests.

The recommendations 180 (together, in some cases, with content-based easy-to-understand explanations for the recommendations) may be transmitted to a variety of presentation devices 185 in different embodiments, such as e-reader devices, portable computing devices, smart phones, and the like. In at least some embodiments, after the models 156 have been trained, the work associated with generating recommendations may not be very compute intensive, and the already-generated descriptors may not consume much memory, so recommendations may be generated on fairly lightweight systems such as the presentation devices themselves. In one embodiment, a recommendation with respect to one text source of a particular type (such as a book) may indicate a text source of another type (e.g., a magazine article or a film may be recommended based on a reader's liking of a book).

Example Neural Network Model

Figure 2:
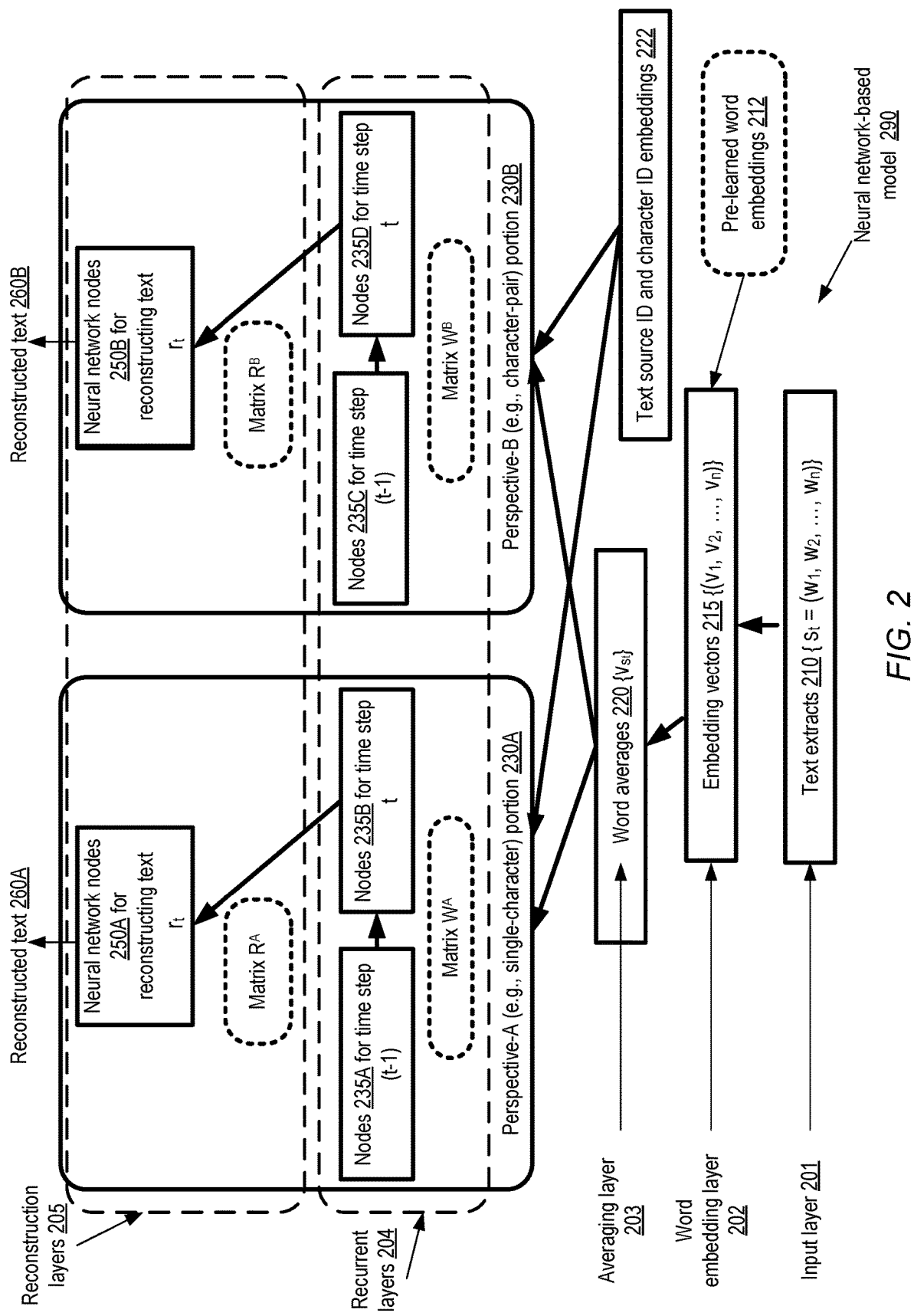
FIG. 2 illustrates layers of an example neural network-based model which may be utilized to generate recommendations for content items, according to at least some embodiments.

FIG. 2 illustrates layers of an example neural network-based model which may be utilized to generate recommendations for content items, according to at least some embodiments. In the depicted embodiment, model 290 comprises respective portions 230A and 230B for two perspectives with respect to content description—a single-character perspective (portion 230A) and a two-character or character-pair perspective (portion 230B). In input layer 201, sequences of text extracts 210 or spans $s_t$ associated with each of the perspectives may be obtained from various text sources. Each of the text extracts may comprise a selected number of consecutive words ($w_1, w_2, \ldots, w_n$) in the depicted embodiment. The extracts for a given perspective and a given set of one or two characters may be ordered based on the order of their appearance in the text source in various embodiments.

At a word embedding layer 202 of the model, embedding vectors 215 may be generated from the text extracts in the depicted embodiment, e.g., using a pre-learned set 212 of word embeddings corresponding to a selected word collection or dictionary. In some embodiments, embeddings 212 may have been published or made publicly available by a third party, as in the case of GloVe (global vectors for word representation) embeddings. In other embodiments, a set of embeddings learned internally at the organization at which the recommendation service is implemented may be used. The sizes of the word vectors may vary in different embodiments. From the vectors 215, respective word averages $\{v_{st}\}$ 220 may be generated in the depicted embodiment at an averaging layer 203 of the model 290.

In various embodiments, the word averages corresponding to the text extracts may be used as part of the input for training each of the portions of the model associated with the different perspectives. In addition, in at least some embodiments, embeddings 222 or vector representations of the identifiers of the text sources (e.g., the books) from which the extracts are taken, and the individual characters represented in the extracts, may also be passed to the perspective-focused layers.

In the depicted embodiment, each portion 230A and 230B may comprise a respective recurrent layer 204 at which weights for a set of descriptors are generated from the word averages, and a respective reconstruction layer 205 at which reconstructed text extracts 260A and 260B are generated using combinations of the descriptors. The symbol $d_t$ may be used to indicate respective weights associated with a set of descriptors corresponding to a time step t in the depicted embodiment (e.g., if 100 text extracts associated with a particular perspective and a particular set of characters are obtained from a book, t may vary from 1 to 100, and the distribution of descriptor weights for a given time step may characterize the content corresponding to the extract associated with that time step). As shown, in layer 204 of model portion 230A, recurrent links or connections may be constructed between nodes 235A (used for generating $d_{t-1}$) and nodes 235B (used for generating $d_t$). Similarly, layer 204 of model portion 230B uses nodes 235C and 235D. A matrix of weights $W^A$ may be learned at the recurrent layer with respect to the single-character perspective, while a matrix of weights $W^B$ may be learned at the recurrent layer with respect to the character-pair perspective in the depicted embodiment. At the reconstruction layer 205, respective weight matrices $R^A$ and $R^B$ may be learned for each of the two perspectives using neural network nodes 250A and 250B in the depicted embodiment, resulting in the output reconstruction vectors $r_t$ representing the reconstructed text corresponding to an input text extract.

In at least some embodiments, a model 290 may be designed with several different types of goals regarding reconstructing text. Each of the goals may be represented in the objective function used to find optimal values of various parameters of the model 290 (such as weight matrices $W^A$, $W^B$, $R^A$, $R^B$, etc.), as discussed below in further detail with respect to FIG. 7. In one embodiment, with respect to each perspective being considered (such as the single-character perspective and the character-pair perspective illustrated in FIG. 2), the goal may include reconstructing true input. The goal of reconstructing true input accurately with respect to a given perspective may be described using the terminology "minimizing same-perspective error" in some embodiments. As mentioned earlier, in some embodiments, "negative" or "fake" samples may also be used during training. In the depicted embodiment, a negative sample may comprise a synthetic text sequence which does not actually appear in the text source being analyzed, but does appear to follow the rules used for obtaining the extracts—e.g., for the character-pairs perspective, the negative extract may include mentions of exactly two characters from the text source, and for the single-character perspective, the negative extract may include a mention of exactly one character of the text source, and so on. A number of synthetic text sequences may be generated in various embodiments for one or more of the perspectives being considered, labeled as negative samples, and used during the training. In a manner similar to the way word averages $v_{st}$ are generated from true samples, word averages $v_n$ may also be generated from negative samples in the depicted embodiment with respect to each perspective. The portion of the model corresponding to a given perspective may be trained (e.g., by using an appropriate objective function of the kind discussed below with respect to FIG. 7) to generate reconstruction vectors whose inner product with the negative sample word averages for that perspective is very small (e.g., close to zero) in various embodiments. In effect, in at least some such embodiments, the differences between the representations of the negative samples of a given perspective and the reconstruction vectors for true inputs of that perspective may be maximized, indicating that the model portion is being trained to reproduce true samples well rather than fake samples, and is thus in some sense learning the actual content of the text rather than arbitrary text.

In addition to the desired outcomes regarding reconstructing true input extracts and negative samples, the model 290 may have another goal in at least some embodiments. The portion of the model associated with a given perspective may be trained to reconstruct input representing other perspectives poorly—e.g., portion 230A in FIG. 2 may ideally reconstruct text extracts with two characters poorly, while portion 230B may ideally reconstruct text extracts with a single character poorly. Such poor "cross-perspective" reconstruction may be desired because the kinds of information being captured with respect to each perspective may be assumed to be independent of the kinds of information being captured with respect to other perspectives in at least some embodiments, and thus the portions of the model which have learned about a given perspective may be expected to perform poorly when tasked with reconstructing input representing a different perspective.

In various embodiments, input layer nodes of model 290 (e.g., at layer 201) may include memory for storing input values and parameters and computer-executable instructions for an initial set of computations on the input values, while intermediary or hidden layer nodes connected to the input layer nodes (such as nodes at layers 202, 203, 204 and part of layer 205) may include memory storing computer-executable instructions and/or data for computing values to be transmitted to the output layer nodes. The output layer nodes connected to the intermediary layer nodes may include memory and/or computer-executable instructions for generating and/or storing output values such as reconstructed text 260A or 260B. Any of a number of types of data structures may be used for storing data at various layers, e.g., including various structures optimized for storing matrices, vectors, arrays, hash tables and the like.

Input Records Used for Training

Figure 3:
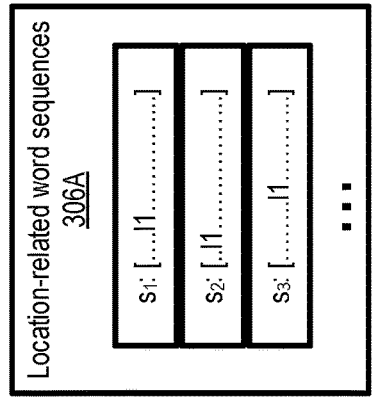
FIG. 3 illustrates examples of text sequences which may be extracted from content items and used as input to a recommendation system, according to at least some embodiments.
Figure 3:
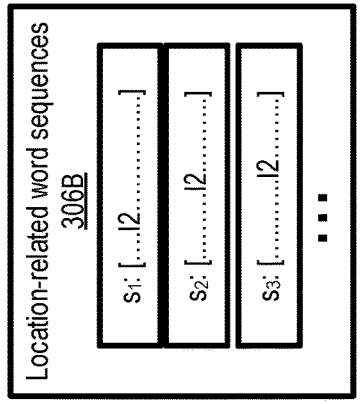
Figure 3:
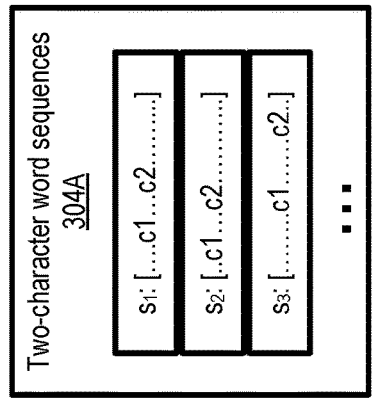
Figure 3:
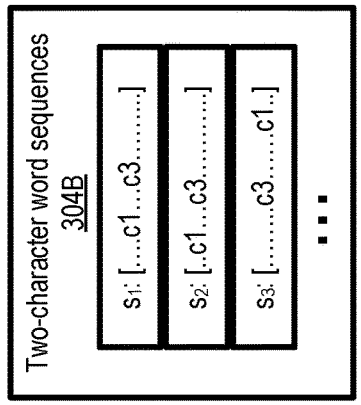
Figure 3:
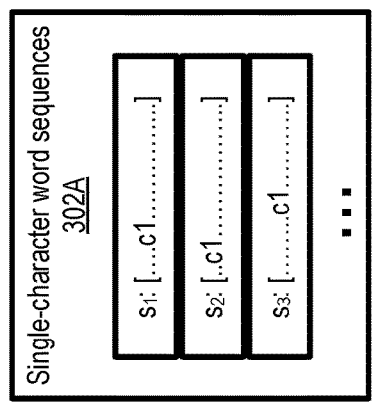
Figure 3:
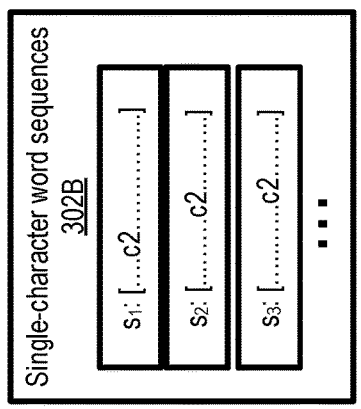
Figure 3:
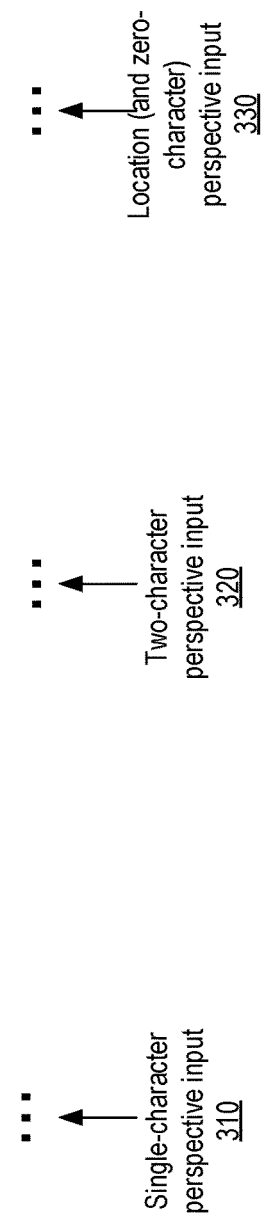

FIG. 3 illustrates examples of text sequences which may be extracted from content items and used as input to a recommendation system, according to at least some embodiments. In the depicted embodiment, a respective set of text extracts from a particular content item such as a book are shown for three content description perspectives: a single-character perspective 310, a two-character perspective 320, and a location perspective 330.

A given text source or content item such as a book may comprise mentions of a plurality of characters c1, c2, c3, etc. as well as some number of locations l1, l2, etc. The text of the content item may be examined in the depicted embodiment, and respective text sequences of N1 words each which contain mentions of exactly one of the characters may be identified. Thus, for example, with respect to a character c1, word sequences or extracts 302A may be identified, while with respect to another character c2, word sequences 302B may be found. Similarly, with respect to a particular pair of characters (c1, c2), word sequences 304A of N2 words each of which mention only those two characters may be found, while word sequences 304B which mention only characters (c1, c3) may be found in the depicted embodiment. With respect to the location perspective, word sequences 306A of length N3 each, in which a single location l1 is mentioned may be extracted from the text source, and with respect to location l2, word sequences 306B may be found. In some embodiments, the same lengths may be chosen for the word sequences corresponding to different perspectives—e.g., N1 may equal N2 and N3 in the above notation.

The input used for training the neural network model may comprise numerous sets of word sequences similar to sequences 302, 304 and 306, for all the different perspectives being included in the model, and for all the different text sources used for training the model, in the depicted embodiment. It is noted that not all the word sequences in a given text source which match the criteria for a given perspective may be extracted for training the model in some embodiments. For example, the total number of example word sequences present in the text for a given character, a given pair of characters or a location may have to exceed a threshold for those word sequences to be used for model training in some embodiments. Furthermore, the number of extracts obtained from a text source for a given character, character pair, or location may not match the total number of such extracts that could have been obtained. For example, a book may contain 1000 examples which can be used for single-character extracts for character C1, and 500 examples which can be used for single-character extracts for character C2, and the modeling methodology may select only 200 examples for each character. Meta-parameters of the model may include the sizes of various extract-related objects or collections (such as the lengths of individual extracts for each of the perspectives, the total number of perspectives being considered, the minimum example population counts for inclusion of various types of extracts in the model, the number of extracts to be included in the training data for each perspective and so on) in various embodiments.

Example Descriptors and Trajectories

Figure 4:
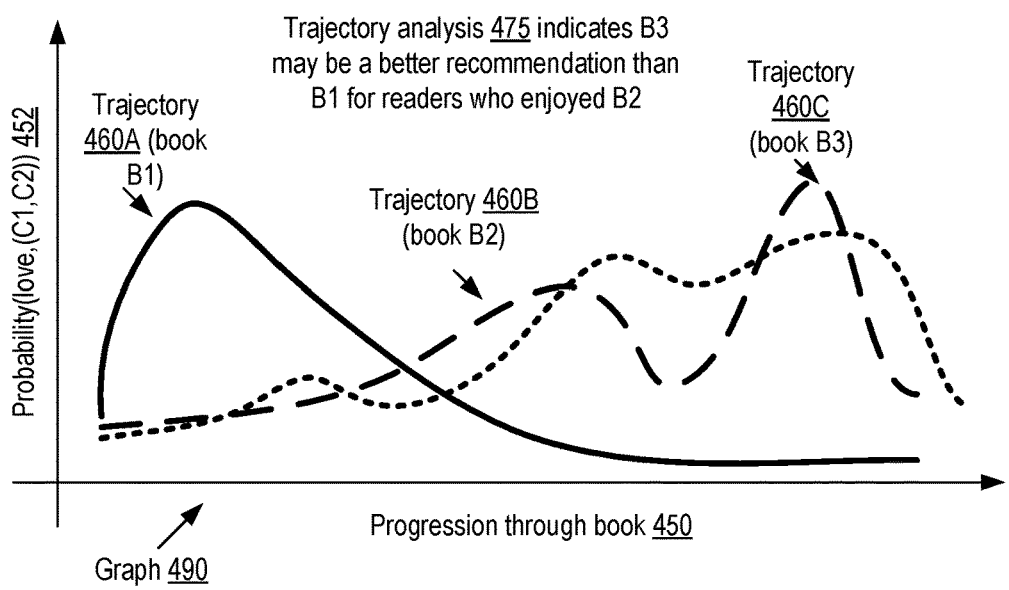
FIG. 4 illustrates examples of induced or learned descriptors associated with a plurality of content description perspectives, as well as examples of trajectories associated with such descriptors, according to at least some embodiments.

FIG. 4 illustrates examples of induced or learned descriptors associated with a plurality of content description perspectives, as well as examples of trajectories associated with such descriptors, according to at least some embodiments. As mentioned earlier, a given learned descriptor may correspond in at least some embodiments to a point in a multidimensional vector space of words. The words of a dictionary or vocabulary used in the neural network model may also be mapped to respective points in such a vector space in various embodiments, but the particular point associated with a descriptor may not necessarily correspond to any given word of the dictionary or vocabulary. To provide a human-understandable representation of such a descriptor, a group of "nearest neighbor" words of the descriptor may be identified in various embodiments, e.g., by calculating distances between the descriptor and the points corresponding to the words of the dictionary. In at least one embodiment, in a second stage of summarization, the set of nearest-neighbor points may be represented by a label comprising a single word or phrase associated with the meanings of the nearest-neighbor words. In some embodiments the label may itself be learned automatically by the recommendation system, while in other embodiments labels may be generated by individuals fluent in the language being analyzed.

In the depicted embodiment, examples of representations of learned descriptors 402 (using nearest-neighbor words as discussed above) such as 402A and 402B corresponding to a single-character perspective are shown, along with associated labels 403 (e.g., 403A and 403B). Similarly, learned descriptors 408A and 408B corresponding to a two-character perspective are shown, together with corresponding labels 409A and 409B. For example, the nearest neighbor word set for descriptor 402A includes "cherish", "dearest", "estrangement", "forsake", "heartache" "loneliness" and "sorrow", and that word set may be mapped to the summarizing label "feelings" 403A. Similarly, with respect to two-character descriptor 408B, with a nearest neighbor word set comprising "fight", "hit", "accuse", "curse", "despise", "hate", "enemy" and "argue", a label "dislike" may be generated in the depicted embodiment.

With respect to a given single character or a pair of characters, sequences of descriptors may be generated using extracts obtained from various locations in a given book or other text source in the depicted embodiment. For example, if a book contains 500 pages, 100 descriptors pertaining to a character pair (C1, C2) may be induced, e.g., from extracts taken from page 5, 13, 26, 27, . . . of the book. The sequence of descriptors corresponding to a given set of characters and a given perspective may be termed a trajectory in various embodiments, and may indicate the evolution of the state of the relationship or characteristic being captured by the perspective as the book progresses. As mentioned earlier, in at least embodiments a comparison of such trajectories obtained from various books may help in generating meaningful content-based recommendations.

Example graph 490 illustrates a trajectory analysis which may be performed in one embodiment with respect to three books B1, B2 and B3. The X-axis 450 represents progression through the books (e.g., with the starting pages of the books close to the origin, and the ends of the books furthest away from the origin), and a probability distribution of some two-character relationship which can be summarized using the label "love" is represented by values along the Y-axis 452. (Note that the books need not be of the same length, nor do the intensities of the relationships necessarily have to be similar in all the books—graph 490 is intended to convey the concepts of trajectory comparisons rather than the details of a given implementation.) With respect to book B1, trajectory 460A indicates that the probability of a "love" relationship is high towards the beginning of B1, but falls towards the end of B1. In contrast, the trajectories 460B and 460C corresponding to books B2 and B3 show similarities, with the peak probability in both cased occurring towards the ends of the books, and similar variations as the book progress. As such, an analysis 475 of the trajectories 460 performed by a recommendation service may suggest that because of the trajectory similarities of B2 and B3, a reader who enjoyed B2 may enjoy B3 more than B1. Trajectories associated with multiple perspectives and/or multiple groups of one or more characters may be analyzed and compared in various embodiments before a recommendation is generated.

Text Reconstruction Outcomes

As mentioned earlier, in various embodiments the neural network model may comprise respective components or portions (e.g., sub-networks comprising some number of artificial neurons or nodes and associated weights) associated with respective perspectives. For example, as indicated in FIG. 2, the model may comprise a perspective-A portion and a perspective-B portion in an embodiment in which two content description perspectives A and B are being considered. The type of information that can be captured from a text extract corresponding to a given perspective may be assumed to be different from the type of information that can be captured from a text extract representing a different perspective. As a result, a portion of the model that has been trained to reproduce input text of one perspective accurately may not be expected be able to reproduce input text another perspective accurately in at least some embodiments. Reproducing text input with respect to a given perspective P1 using the portion of the model that is trained primarily for that perspective P1 may be referred to as same-perspective reconstruction in at least some embodiments, while reproducing text input with respect to a different perspective (e.g., reproducing P2 text using the P1 portion of the model) may be referred to as cross-perspective reconstruction. Corresponding to these two types of reconstruction, two types of error metrics may be generated for the model's output in at least some embodiments—same-perspective error metrics (representing the accuracy of same-perspective reconstruction for each of the individual perspectives being considered) and cross-perspective error metrics (representing the accuracy of cross-perspective reconstructions for various pairs of perspectives). In at least some embodiments, a goal of the model may include minimizing same-perspective error while maximizing cross-perspective error.

Figure 5:
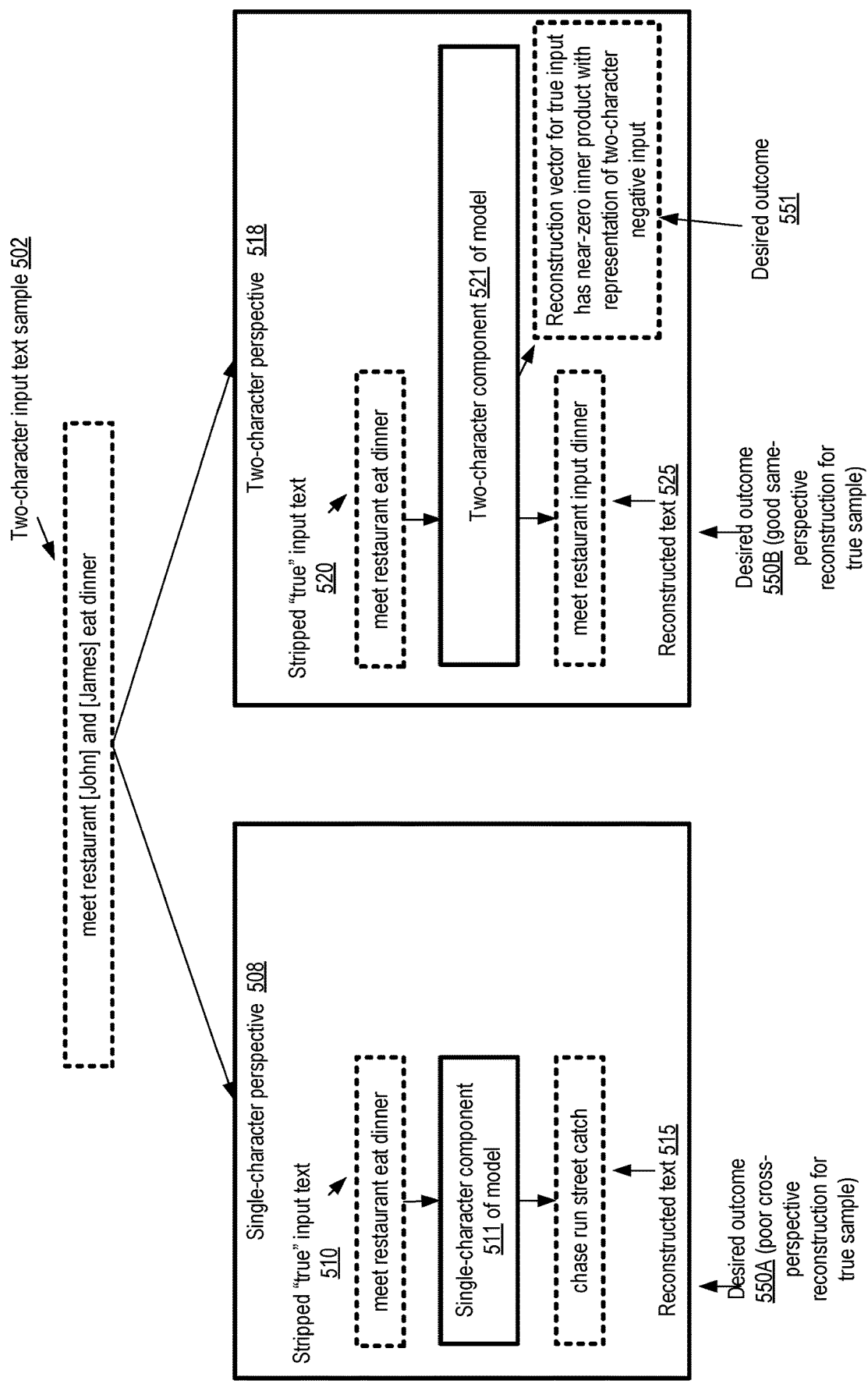
FIG. 5 illustrates examples of desired text reconstruction scenarios associated with input samples representing a two-character perspective, according to at least some embodiments.

FIG. 5 illustrates examples of desired text reconstruction scenarios associated with input samples representing a two-character perspective, according to at least some embodiments. In the depicted embodiment, a two-character perspective component 521 of the model may be trained to accurately reconstruct "true" two-character input text extracts such as sample 502. In the example illustrated, from a "true" input extract comprising the text "meet restaurant John and James eat dinner" 502, the names of the characters John and James may be stripped, and the two-character component 521 may be trained to accurately reproduce the stripped version of the true text "meet restaurant eat dinner" using descriptors of the kind discussed above. If the reconstructed text 525 matches, or comes close to matching the true input text 520 in the two-character perspective reconstruction portion 518 of the model, this good same-perspective reconstruction accuracy may represent a first type of desired outcome 550B in the depicted embodiment.

The training of the two-character perspective component 521 may also utilize negative or fake samples in the depicted embodiment. The model may, for example, be trained such that a reconstruction vector (r, using the terminology discussed in the context of FIG. 2) from a state of the two-character which can reproduce true two-character samples accurately is very different from (and thus has near-zero inner products with) the input representation vectors ($r_n$) of fake or negative two-character samples, as indicated by desired outcome 551.

If the same stripped text extract (e.g., text 510) representing two characters is provided as input to the single-character reconstruction portion 508 of the model, the text generated as output 515 may also not be expected to match the input closely in the depicted embodiment. Thus, if significantly different reconstructed text such as "chase run street catch" 515 is produced by the single-character portion 511 of the model for two-character input 510 comprising "meet restaurant eat dinner", this poor cross-perspective reconstruction may also constitute a desired outcome 550A in the depicted embodiment.

Figure 6:
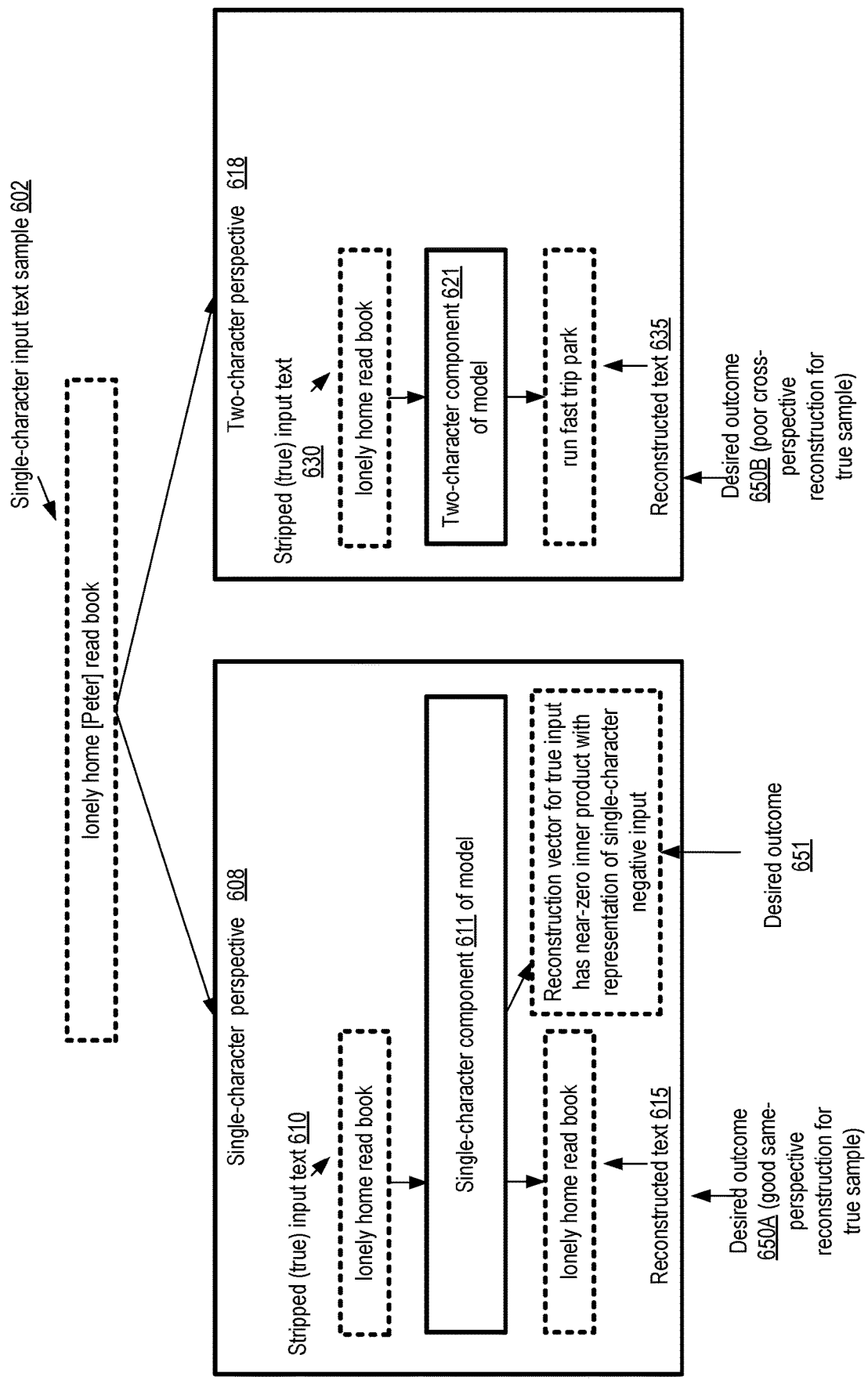
FIG. 6 illustrates examples of desired text reconstruction scenarios associated with input samples representing a single-character perspective, according to at least some embodiments.

FIG. 5 was focused on the types of desirable outcomes when a two-character input sample is used at a model that comprises a single-character portion as well as a two-character portion. FIG. 6 illustrates examples of desired text reconstruction scenarios associated with input samples representing a single-character perspective used at a model that comprises a single-character portion 608 as well as a two-character portion 618, according to at least some embodiments. Once again, both true and negative samples of single-character text extracts may be used, as in FIG. 5. The true single-character text extract "lonely home Peter read book" may be transformed to the stripped "lonely home read book" true input 610 and 630

Three examples of desirable outcomes are shown in FIG. 6, analogous to those shown in FIG. 5. In the first type of desirable outcome 650A, a single-character perspective component 611 of the model is able to accurately reconstruct a true single-character text sample 602 (as indicated by output 615), in another example of good same-perspective text reconstruction. In a second type of desired outcome 650B, true input text 630 which represents a single-character perspective may not be reconstructed very accurately by the two-character perspective component 621 of the model as indicated by text 635. This second outcome 650B may also represent a poor cross-perspective reconstruction in the depicted embodiment. In the third type of desired outcome 651, the inner product of a reconstruction vector (which corresponds to a model state in which the reconstruction of true single-character input is accurate) with an input representation of negative single-character samples may be minimized, in a manner analogous to that discussed for output 551 in the context of FIG. 5. In various embodiments, the types of outcomes indicated in FIG. 5 and FIG. 6 may be represented by corresponding terms in the objective functions used during training of the model, as discussed below.

Objective Function Example

Figure 7:
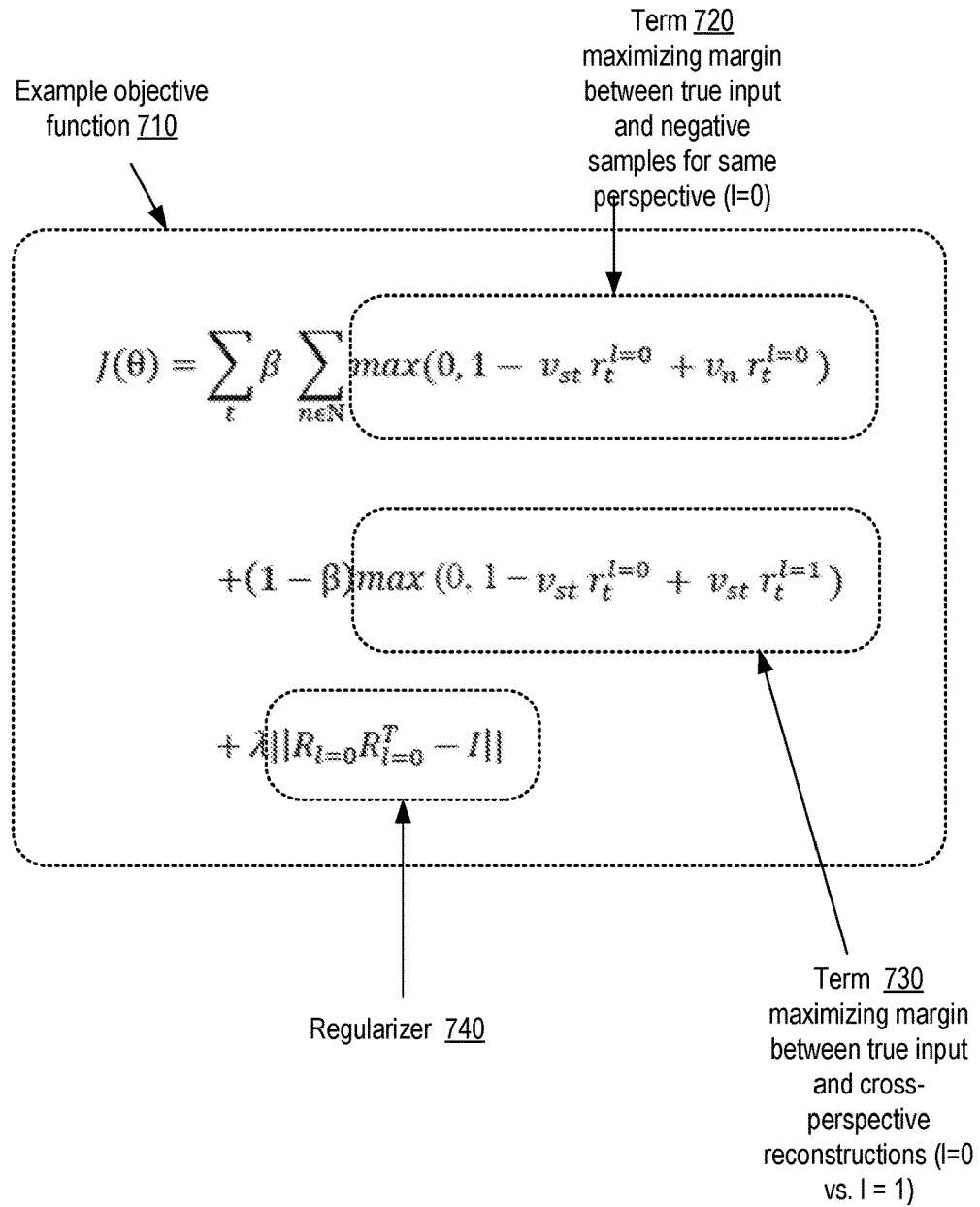
FIG. 7 illustrates an example objective function which may be used during training of a machine learning model used for recommending content, according to at least some embodiments.

FIG. 7 illustrates an example objective function which may be used during training of a machine learning model used for recommending content, according to at least some embodiments. In the depicted example, the model is assumed to comprise respective portions for two content-description perspectives, such as the single-character perspective and the character-pair perspective discussed in the context of FIG. 5 and FIG. 6. A binary indicator variable 1 may be used to indicate the perspective associated with the input text in the depicted embodiment (e.g., l=0 corresponds to a single-character perspective, whole l=1 corresponds to the two-character perspective). As discussed earlier in the context of FIG. 2, for each of the perspectives, a matrix of descriptors may be learned at respective portions of the model, e.g., $R^A$ for the first perspective and $R^B$ for the second perspective. Then, the input text may be reconstructed using linear combinations of the descriptors in various embodiments.

In a hinge-loss based objective function $J(\theta)$ 710 as formulated in FIG. 7, $\theta$ represents the parameters of the model for which optimal values are to be determined, $\beta$ represents a weight assigned to same-perspective errors relative to cross-perspective errors, t represents the number of distinct "time steps" (the number of extracts in a sequence of extracts for a given perspective), $v_n$ represent individual negative samples of a total of N negative samples, and $\lambda$ represents the wright of the regularization term 740. The $r_t$ terms represent the reconstructed text with respect to the perspective indicated by the l indicator variable. Term 720 maximizes the margin between true inputs $v_{st}$ and negative samples for the same perspective, while term 730 maximizes the margin between true inputs and the cross-perspective reconstruction.

By using an objective function similar to 710, the model may be directed towards the desired reconstruction objectives illustrated in FIG. 5 and FIG. 6 in the depicted embodiment. For example, each perspective-specific portion of the model may be trained to reconstruct same-perspective input accurately (minimizing same-perspective error) while minimizing inner products between reconstruction vectors and input representations of negative samples of the same perspective. Furthermore, the model may also be trained to maximize cross-perspective error—that is, each perspective-specific portion of the model may be trained to perform poorly at reconstructing input representing the other perspective. Objective functions similar to 710 may be extended to cover more than two perspectives in at least some embodiments. Other objective functions, at least some of which may also be based on hinge loss functions as in the case of function 710, may be used in some embodiments.

Model Training Alternatives

A variety of approaches may be taken with respect to the order in which samples representing different perspectives are provided as input to train the model in different embodiments. In at least one embodiment, semantics associated with the different perspectives may be taken into account— e.g., the different perspectives may be arranged in order of increasing or decreasing specificity of detail regarding the content, and the extracts may be provided to the model in that order.

Figure 8:
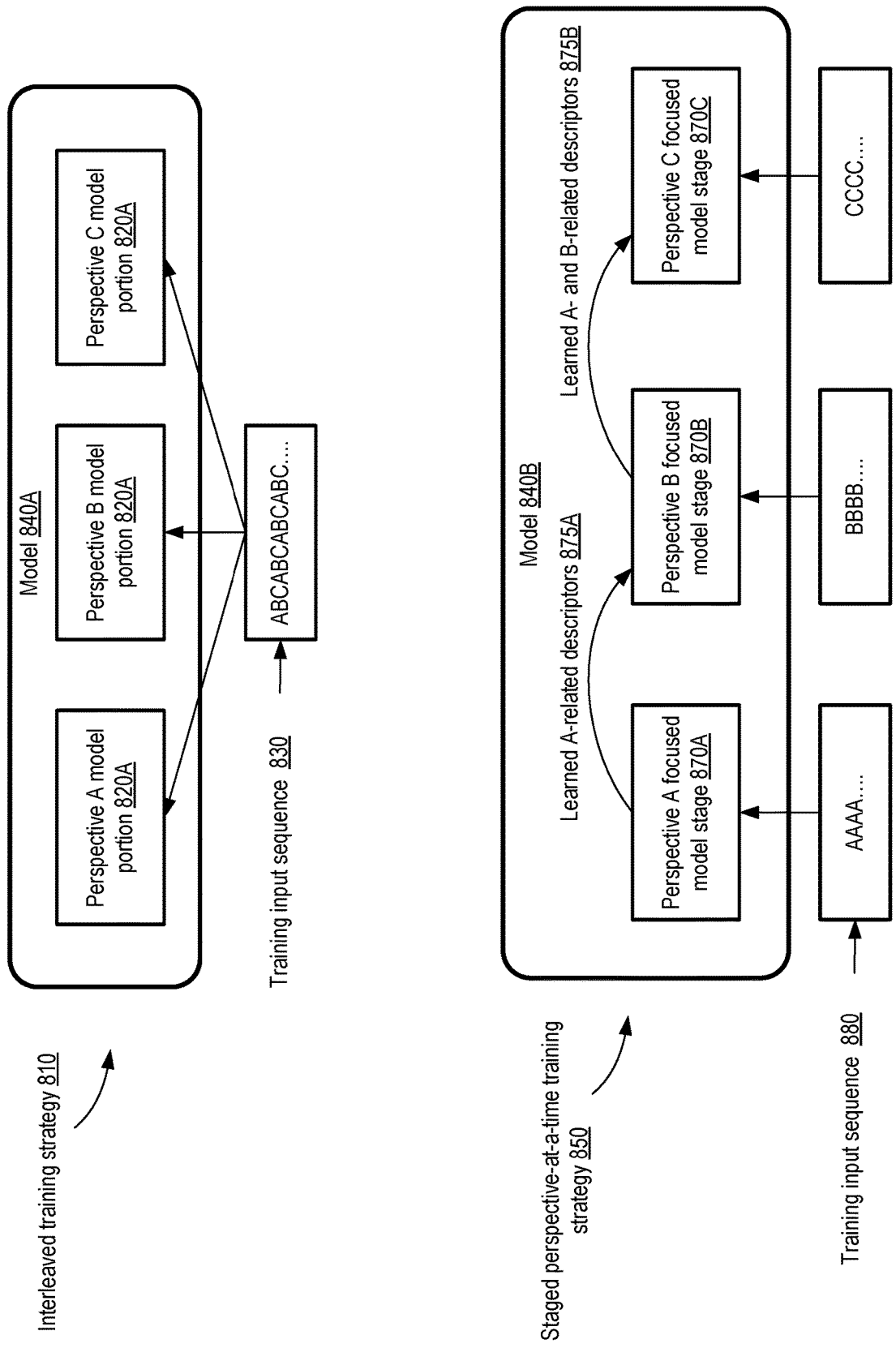
FIG. 8 illustrates examples of training strategies which may be used for a machine learning model used for recommending content, according to at least some embodiments.

FIG. 8 illustrates examples of training strategies which may be used for a machine learning model used for recommending content, according to at least some embodiments. Respective model portions 820A or components associated with three character description perspectives labeled A, B and C are included in the neural network model 840A in each of the strategies shown. In an interleaved training strategy 810, records associated with each perspective may be fed as input in an interleaved order 830—e.g., in the order ABCABCABCABC . . . or the equivalent. It is noted that the interleaving may not necessarily be strict in at least some embodiments, as long as within a given sequence of N training records, an approximately similar number of records of each perspective are used. For example, training the model with an input extract sequence ABCBA-CABCCBA may also be considered an example of interleaved training in at least some embodiments. In an embodiment in which the interleaved training strategy is used, in effect the model learns about different perspectives in parallel. The portions of the model corresponding to the different perspectives (such as the weight matrices associated with various perspectives) may remain mutable throughout the training, being gradually adjusted as more input data is analyzed and more learning occurs.

In a staged perspective-at-a-time training strategy 850 which may be employed in some embodiments, the model may first be trained using multiple input samples corresponding to one perspective, and then using multiple input samples corresponding to a second perspective, and so on. At each stage, in some embodiments, parameter values (e.g., weights) associated primarily with one perspective may be learned, and those parameter values may remain largely fixed or immutable during subsequent stages. In at least one embodiment, as mentioned earlier, the order in which the perspectives are arranged in stages may represent increasing specificity or increasing detail regarding the content of the text source—e.g., in the first stage, more general content characteristics such as location or events may be learned, in the second stage single-character characteristics may be learned, in the third stage multi-character characteristics may be learned, and so on. As shown, in perspective A-focused model training stage 870A, input comprising samples of type A alone (AAAA . . . ) may be provided to the model 840B, and some number of descriptors usable for reproducing such samples may be learned. Then, in a second, perspective B-focused stage 870B, input comprising B samples (e.g., BBBB . . . ) may be provided to the model, while a set of learned A-related descriptors 875A may be kept constant in the depicted embodiment. Finally, in the three-perspective example scenario shown, a perspective C-focused training phase 870C may be implemented, during which input text extracts CCCC . . . may be fed to the model, with learned descriptors 875B representing the A and B perspective skep to constant. In some embodiments in which the input sequence similar to staged sequence 880 is used, a different type of objective function may be used than that discussed above in the context of FIG. 7. Other approaches towards ordering input examples during training than those shown in FIG. 8 may be used in some embodiments—e.g., a random ordering may be used in one embodiment.

Methods for Generating Content-Based Recommendations

Figure 9:
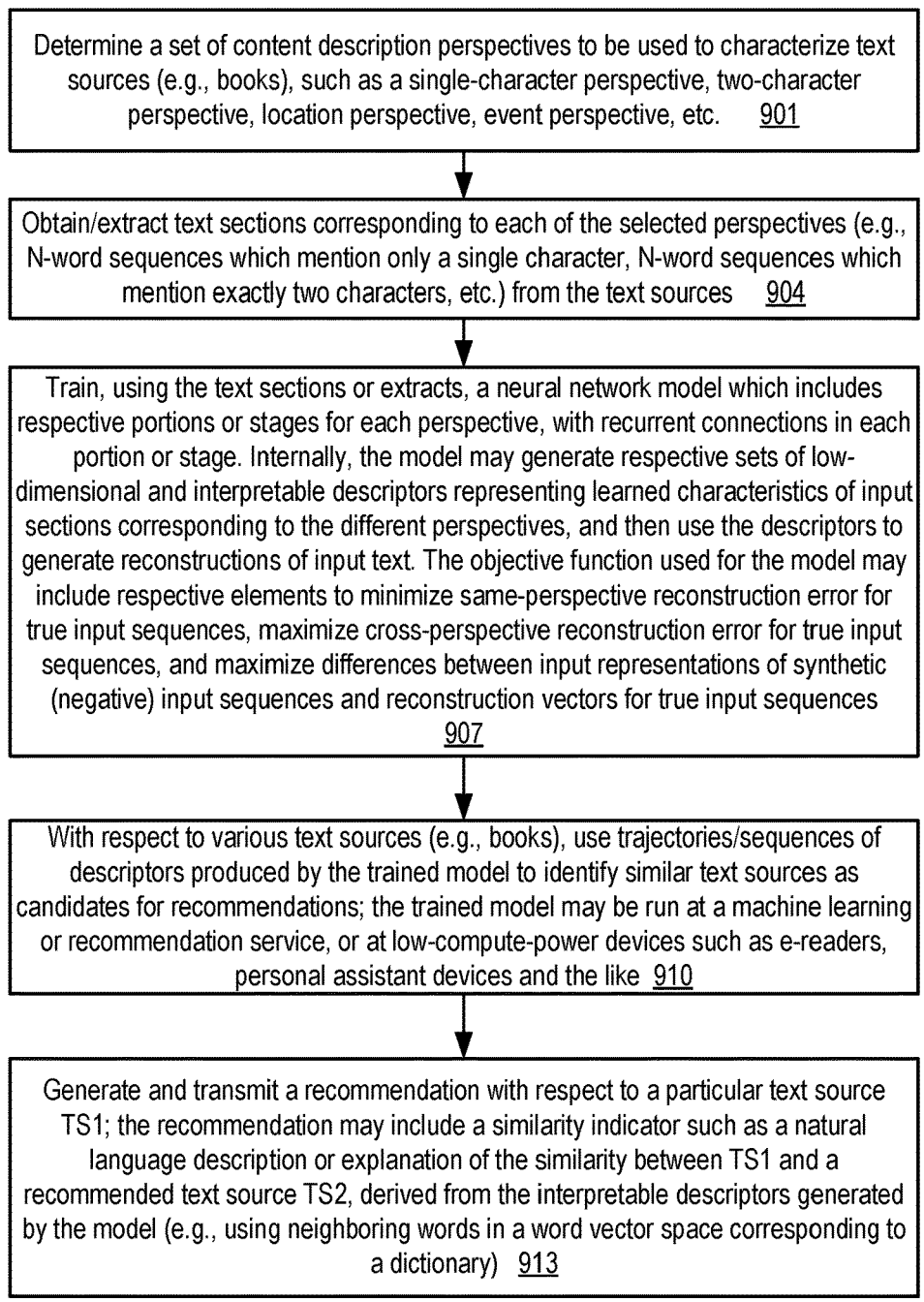
FIG. 9 is a flow diagram illustrating aspects of operations that may be performed by content-based multi-perspective recommendation system, according to at least some embodiments.

FIG. 9 is a flow diagram illustrating aspects of operations that may be performed by content-based multi-perspective recommendation system, according to at least some embodiments. As shown in element 901, a set of content description perspectives to be used to characterize (and generate recommendations based on similarities among) a group of text sources such as books may be identified, e.g., at a recommendation service comprising a plurality of computing devices in the depicted embodiment. A variety of content description perspectives may be identified in various embodiments, depending on the genres to which the text sources belong, such as a single-character perspective, a two-character or character-pair perspective, an event perspective, a location perspective, a temporal perspective, and so on. Values for a number of meta-parameters associated with the analysis of the text sources may be identified in the depicted example, e.g., the lengths of various text extracts to be obtained corresponding to the different perspectives, the minimum number of examples of a particular combination of (characters, perspectives) required for inclusion in the analysis (such as the minimum number of times a particular pair of characters C1 and C2 are referred to within different sequences of N words within a book, with respect to a two-character perspective), the particular set of pre-learned word embeddings (e.g., GloVe embeddings) to be used in the analysis etc.

Respective sequences of text extracts corresponding to the different perspectives may be obtained from the text sources in the depicted embodiment (element 904), e.g., in accordance with the meta-parameter values selected. For example, extracts of N words each which contain exactly one mention of a character may be obtained with respect to a single-character perspective, as long as at least M such extracts exist in the text source. Similarly, extracts of N words each which contain mentions of exactly two characters may be obtained with respect to a character-pair perspective, as long as least P such extracts exist in the text source, and so on. The extracts may be processed in several ways in different embodiments, e.g., by changing case to all lower case or all upper case, by stripping the names of the characters while retaining an indication of which extracts correspond to which characters, etc.

As indicated in element 907, a neural network-based model may be trained using at least the text extracts or sections as input in various embodiments. The model may include respective portions or stages for each perspective, with recurrent connections in at least some portions or stages in at least one implementation. Internally, the model may generate respective sets of low-dimensional and interpretable descriptors representing learned characteristics of input text sections corresponding to the different perspectives, and then use the descriptors to generate reconstructions of input text in at least some embodiments. An individual descriptor may correspond, for example, to a point within a word vector space in various embodiments. An objective function used for the model may include respective elements to minimize same-perspective reconstruction error for true input sequences, maximize cross-perspective reconstruction error for true input sequences, and/or minimize similarity (e.g., as computed via inner products) between input representations of synthetic (negative) input sequences and reconstruction vectors for true sample reproduction in some embodiments. That is, in at least one embodiment, with respect to a given perspective $P_j$, the portion of the model associated with $P_j$ may be trained to (a) generate descriptors from text samples representing perspective $P_j$ which can be used to accurately reproduce actual text samples of perspective $P_j$ obtained from the text source (b) generate descriptors from text samples representing perspective $P_k$ which can be used to reproduce actual text samples of perspective $P_k$ obtained from the text source with poor accuracy and/or (c) in effect, be poor at reproducing synthetic or fake text samples representing perspective $P_j$. As mentioned above, a low level of accuracy for cross-perspective text extract reproduction may be considered desirable in at least some embodiment because the kind of information captured from the extracts corresponding to each perspective may be assumed to be orthogonal or independent of the kinds of information captured from the extracts corresponding to other perspectives, so the portion of the model responsible for accurately reproducing text for perspective $P_j$ may not be expected to learn to predict text representing perspective $P_k$ (or synthetic text which, while meeting the definitional requirements for $P_j$, does not actually come from the text source itself and therefore is not truly representative of the $P_j$ perspective). In at least one embodiment, a hinge loss function may be used for at least part of the objective function.

A number of approaches may be taken with respect to evaluating the model in different embodiments. In one embodiment, the results of previously-implemented orthogonal techniques to characterize the text sources may be used to evaluate the model. For example, a library of books may already have been grouped into genres such as "mystery", "horror", "science fiction" and the like. In at least one embodiment, a clustering algorithm or an algorithm such as K-nearest neighbors may be used on the descriptors or trajectories produced by the neural network model to determine whether books that were designated as being similar to one another by the earlier classification approach are also found to be similar by the neural network model or not. In at least one embodiment, provider network or cloud-based resources may be used for training and/or evaluating the model, while after the model has been trained, it may be executed on a wider variety of computing devices. In one embodiment, for example, from among a plurality of execution platforms of a provider network, one or more execution platforms may be identified or selected for training the model, and the trained model may be deployed to e-reader devices, phones, personal assistant devices and the like for generating the recommendations.

After the model has been trained and evaluated, descriptors corresponding to the various perspectives generated from the various text sources may be compared in a next stage of the analysis in at least some embodiments. For example, as indicated in element 910, the trajectories/sequences of descriptors produced by the trained model may be compared to identify similar text sources as candidates for recommendations. A given trajectory may correspond to the sequence of descriptors derived for a given perspective (and, for those perspective involving characters, a given set of one or more characters) generated from the ordered sequence of text extracts obtained from the text source in at least some embodiments. Any of a number of similarity analysis algorithms (such as various types of clustering algorithms or N-nearest-neighbor algorithms) may be used to compare the trajectories or evolution of the descriptors in various embodiments. For example, in at least some embodiments the similarity analysis may comprise determining a distance between a point representing a particular descriptor in vector space and another point in the vector space, wherein the other point represents a particular word from a pre-selected dictionary of words. In different embodiments, the trained model may be run at a machine learning or recommendation service, or at low-compute-power devices such as e-readers, personal assistant devices and the like.

Based at least in part on the comparison of the descriptors generated for various perspectives for various text sources, a recommendation with respect to a particular text source TS1 may be generated and transmitted in some embodiments (element 913). For example, if a particular reader has provided feedback indicating a liking or preference for TS1, a different text source TS2 whose descriptor trajectories are at least somewhat similar to those of TS1 for one or more perspectives may be identified as a recommendation candidate in one embodiment. The recommendation may include a similarity indicator, such as a natural language description or explanation of the similarity of content between TS1 and a recommended text source TS2, derived from the interpretable descriptors generated by the model (e.g., using neighboring words in a word vector space corresponding to a dictionary) in some embodiments. In at least one embodiment, the recommendation serviced or tool may be able to provide natural language representations of one or more of the generated descriptors associated with one or more text sources and perspectives, e.g., for debugging or analysis purposes.

It is noted that in various embodiments, some of the operations shown in FIG. 9 may be implemented in a different order than that shown in the figure, or may be performed in parallel rather than sequentially. Additionally, some of the operations shown in FIG. 9 may not be required in one or more implementations. In some embodiments, machine learning models which do not necessarily comprise neural networks, or which may combine neural network with other types of models, may be used to generate the descriptors used for recommendations.

Provider Network Environment

Figure 10:
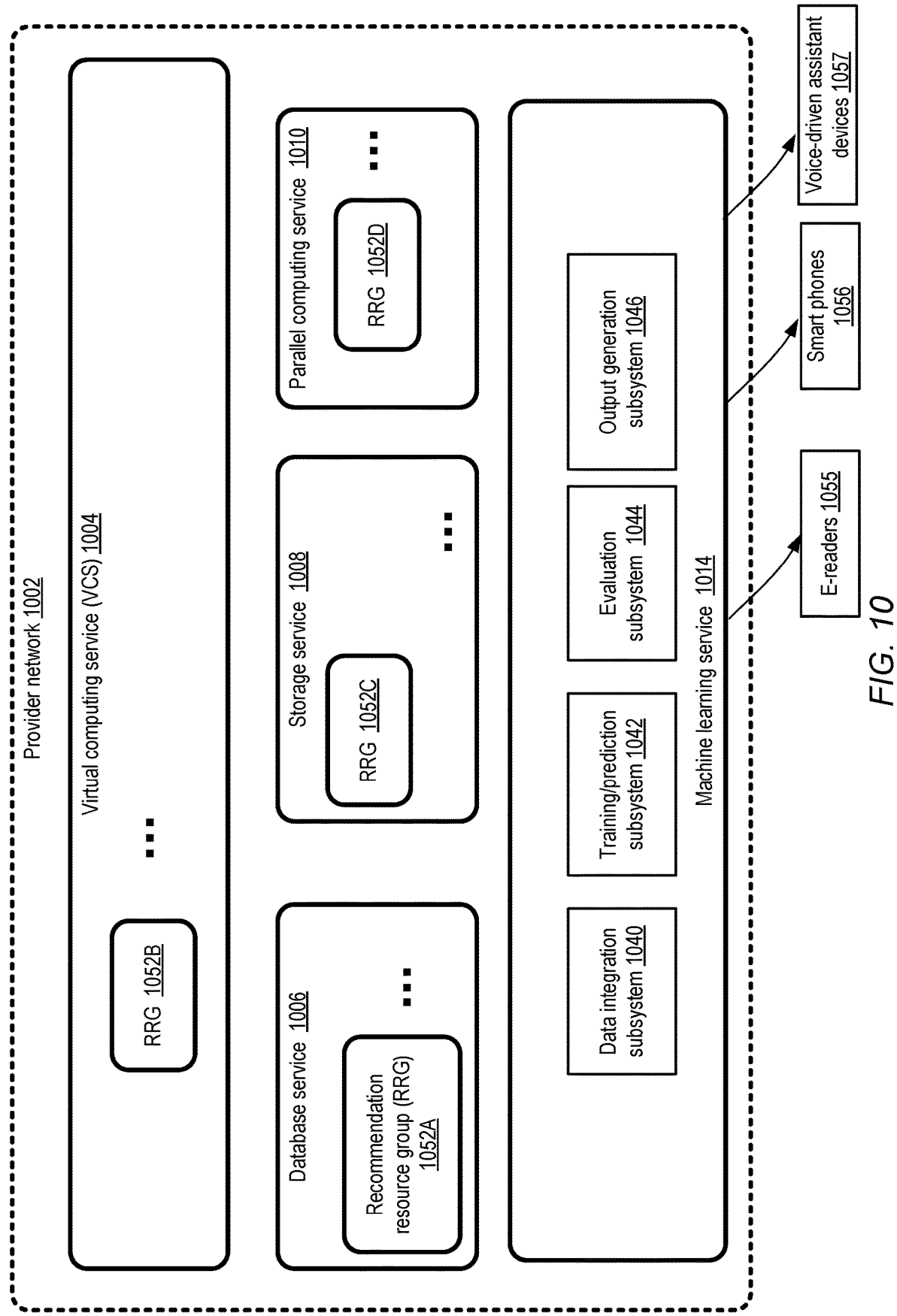
FIG. 10 illustrates an example provider network environment in which content-based recommendations may be generated, according to at least some embodiments.

FIG. 10 illustrates an example provider network environment in which content-based recommendations may be generated, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

The services implemented at provider network 1002 in the depicted embodiment may include, for example, a virtual computing service 1004, a database service 1006, a storage service 1008, a parallel computing service 1010, and a machine learning service 1014. As shown, the machine learning service 1014 may comprise a data integration subsystem 1040, training subsystem 1042, evaluation subsystem 1044 and an output generation subsystem 1046 in the depicted embodiment. These subsystems may collectively be used to implement workflows or pipelines of tasks associated with content-based recommendation-related analysis, such as collecting/aggregating training data sets at the integration subsystem, training neural network models at the training subsystem, and so on. Each of the services of provider network 1002 may expose respective sets of programmatic interfaces to its clients in the depicted embodiment. Some of the services of a provider network may utilize resources of other services in various embodiments. For example, with respect to a particular set of text sources for which recommendation-related analysis using the descriptor-based approach discussed above is to be performed, respective recommendation resource groups (RRGs) 1052 such as RRGs 1052A, 1052B, 1052C and 1052D of database service 1006, virtual computing service 1004, storage service 1008 and parallel computing service 1010 may be used. The database service and/or the storage service may be used, for example, to store various raw text sources, various intermediate results and the like, and the remaining two services may be used for performing various computation steps. Respective instances of a trained neural network model used for relationship analysis may be run on behalf of the machine learning service at various virtual machines (e.g., including virtual machines instantiated at hosts comprising graphics processing units or GPUs) of the virtualized computing service, e.g., in parallel, in some embodiments. In the depicted embodiment, in some cases the trained neural network model and associated descriptor similarity analysis tools may be deployed to and executed at various external devices, such as e-reader devices 1055, phone devices 1056, voice-driven personal assistant devices 1057 and the like.

It is noted that at least in some embodiments, a machine learning service (MLS) infrastructure similar to that shown in FIG. 10 may be set up for internal use within a particular organization or business entity. For example, the customers of the recommendation service or tool and other components of the MLS may be part of the same business entity which implements the MLS. An Internet-based retailer may utilize such a private machine learning service infrastructure for generating recommendations for text sources such as books embodiments.

Use Cases

The techniques described above, of utilizing neural-network based models to generate low-dimension interpretable descriptors corresponding to multiple perspectives for books and other text sources, and utilize the descriptors to generate content-based recommendations, may be useful in a variety of scenarios. The inventories of many book retailers, including Internet-based retailers, may often include large numbers of relatively infrequently-sold books as well as some books that sell much more frequently. In order to be able to generate recommendations for a newly-published book or a currently infrequently-selling book, relying on a recommendation technique that tries to identify similar readers demographically may not necessarily work very well, since the pool of existing readers may not be large. As such, a technique which characterizes the content of the books for recommendation purposes, and uses multiple orthogonal perspectives to do so, may work better than at least some commonly-used approaches.

Illustrative Computer System

Figure 11:
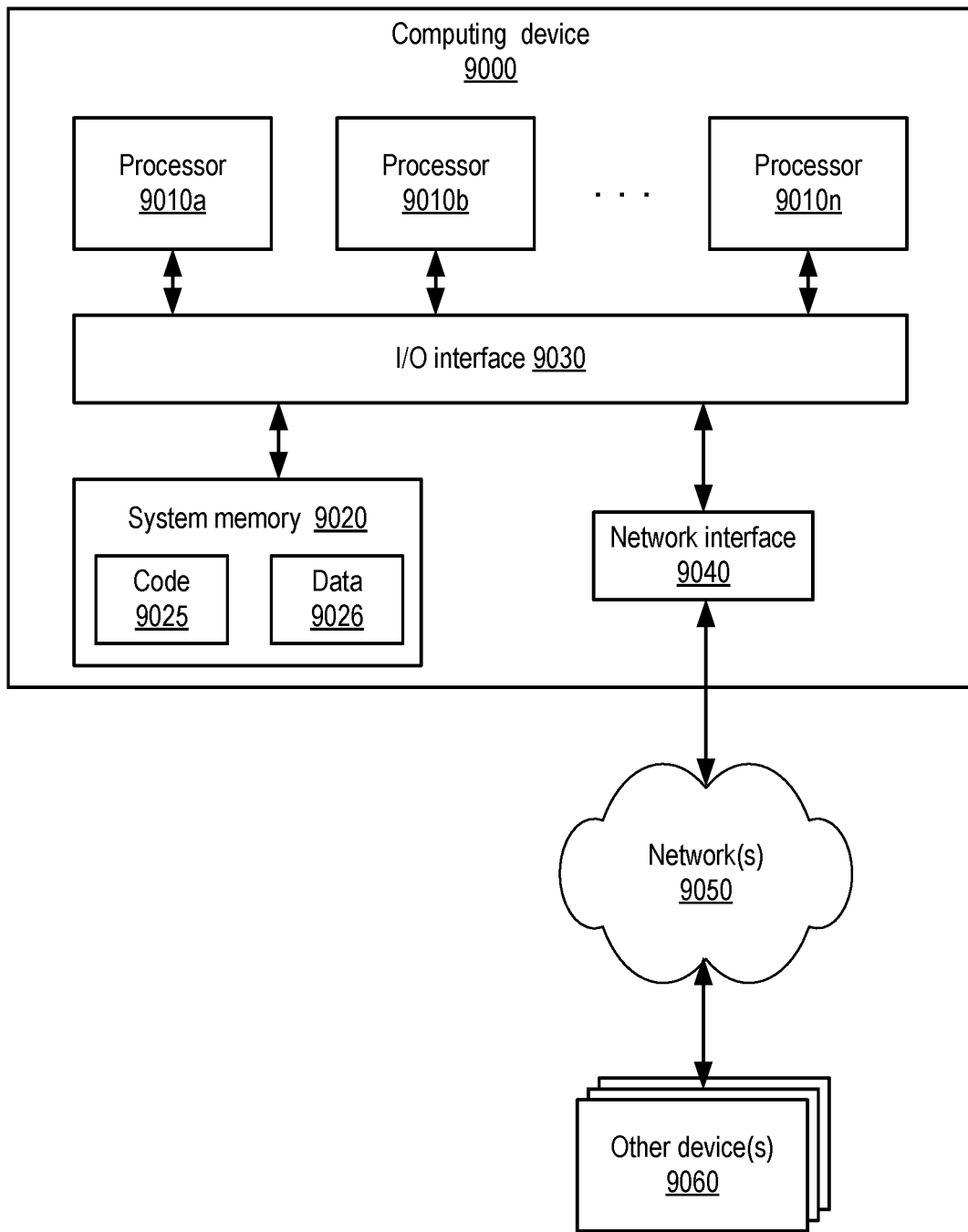
FIG. 11 is a block diagram illustrating an example computing device that may be used in at least some embodiments.

In at least some embodiments, a server that implements a portion or all of one or more of the technologies described herein, including the descriptor-based recommendation techniques using a neural network or machine learning model, may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a neural-network based artificial intelligence service for generating recommendations;
wherein the one or more computing devices are configured to:
identify a plurality of content description perspectives to be used to characterize a plurality of books, wherein a first book of the plurality of books includes mentions of a plurality of characters, wherein the plurality of content description perspectives includes a single-character perspective and a multi-character perspective;
obtain, from the first book, a plurality of sequences of text extracts including a first sequence and a second sequence, wherein individual ones of the text extracts of the first sequence comprise mentions of one character, and wherein individual ones of the text extracts of the second sequence comprise mentions of multiple characters;
train, using at least the plurality of sequences as input, a neural network model comprising a single-character portion and a multi-character portion, wherein the neural network model is trained to:
generate a plurality of descriptors, including (a) a single-character perspective descriptor learned using at least the single-character portion and (b) a multi-character perspective descriptor learned using at least the multi-character portion, wherein the single-character perspective descriptor corresponds to characteristics of a character mentioned in the first sequence, and wherein the multi-character perspective descriptor corresponds to a relationship between multiple characters mentioned in the second sequence; and produce, using the plurality of descriptors, a respective reconstructed text section corresponding to one or more text extracts of the input, wherein an objective function of the neural network model comprises a respective element to (a) minimize a same-perspective error and (b) maximize a cross-perspective error, wherein the same-perspective error is based at least in part on a comparison of a reconstructed text section produced by the single-character portion with an input text extract comprising a mention of one character, and wherein the cross-perspective error is based at least in part on a comparison of another reconstructed text section produced by the single-character portion with an input text extract comprising a mention of more than one character; and provide, via a programmatic interface, a book recommendation generated using at least one descriptor of the plurality of descriptors, wherein the book recommendation comprises a natural language representation of a relationship between contents of the first book and a recommended book, wherein the natural language representation is based at least in part on the at least one descriptors.

2. The system as recited in claim 1, wherein the plurality of content description perspectives comprises an additional perspective comprising one or more of: (a) an event perspective or (b) a location perspective, wherein the neural network model comprises a portion corresponding to the additional perspective, wherein the neural network model is trained to:

generate, using the portion of the neural network model corresponding to the additional perspective, an additional descriptor corresponding to the additional perspective.

3. The system as recited in claim 1, wherein the at least one descriptor on which the natural language representation is based comprise a particular descriptor corresponding to a particular point in a word vector set corresponding to a dictionary, wherein the one or more computing devices are configured to:

identify, with respect to the particular descriptor, one or more neighboring words within the dictionary, based at least in on a distance metric associated individual pairs of words of the word vector set; and utilize the one or more neighboring words to generate the natural language representation.

4. The system as recited in claim 1, wherein the one or more computing devices are configured to:

compare (a) a first sequence of descriptors, corresponding to a particular content description perspective, wherein the first sequence of descriptors is generated from the first book with (b) a second sequence of descriptors, corresponding to the particular content description perspective, wherein the second sequence of descriptors is generated from the recommended book; and utilize a result of the comparison to generate the book recommendation.

5. The system as recited in claim 1, wherein the one or more computing devices are configured to:

evaluate, prior to generating the book recommendation, the trained neural network model using one or more of: (a) a clustering algorithm, or (b) a K-nearest neighbors algorithm.

6. A method, comprising:

performing, by one or more computing devices:

obtaining, from a first book of a plurality of books, a plurality of text sections, wherein individual ones of the sections are associated with a particular perspective of a plurality of content description perspectives, wherein the plurality of content description perspectives include a single-character perspective and a multi-character perspective, wherein an individual text section associated with a first single-character perspective comprises mentions of one character, and wherein an individual text section associated with a first multi-character perspective comprise mentions of multiple characters;

training, using at least the plurality of text sections as input, a neural network model comprising at least (a) a single-character perspective portion including a first set of weights and (b) a multi-character perspective portion including a second set of weights, wherein the neural network model produces, using one or more learned descriptors, a respective reconstructed text section as output corresponding to an input text section, wherein a first learned descriptor of the one or more learned descriptors represents a point corresponding to one or more input text sections within a word vector space; and providing a book recommendation generated using the trained neural network model, wherein the book recommendation comprises a content-based similarity indicator with respect to the first book and a recommended book, wherein the content-based similarity indicator is based at least in part on a learned descriptor of the one or more learned descriptors.

7. The method as recited in claim 6, wherein an objective function used for training the neural network model includes a first error term, wherein the first error term based at least in part on a difference between a particular input text section and a corresponding reconstructed text section produced by a particular portion of the model, wherein the particular portion corresponds to a different perspective than the particular input text section.

8. The method as recited in claim 6, wherein the one or more learned descriptors include (a) a single-character perspective descriptor generated by the single-character perspective portion and (b) a multi-character perspective descriptor generated by the multi-character perspective portion, wherein the single-character perspective descriptor represents characteristics of a character mentioned in a first single-character perspective text section, and wherein the multi-character perspective descriptor represents characteristics of a relationship between multiple characters mentioned in a first multi-character perspective text section.

9. The method as recited in claim 6, wherein the plurality of content description perspectives includes an additional perspective comprising one or more of: (a) an event perspective, (b) a location perspective, wherein the neural network model comprises a portion corresponding to the additional perspective, the method further comprising performing, by the one or more computing devices:

generating, using at least the portion of the neural network model corresponding to the additional perspective, an additional descriptor corresponding to the additional perspective; and utilizing the additional descriptor to generate the book recommendation.

10. The method as recited in claim 6, further comprising performing, by the one or more computing devices:
evaluating, prior to generating the book recommendation, the trained neural network model using one or more of: (a) a clustering algorithm, or (b) a K-nearest neighbors algorithm.

11. The method as recited in claim 6, further comprising performing, by the one or more computing devices:
determining, based at least in part on the respective content description perspectives to which individual ones of the plurality of text sections correspond, an order in which individual ones of the plurality of text sections are to be provided as input to train the neural network model.

12. The method as recited in claim 11, further comprising performing, by the one or more computing devices:
in accordance with the order, including, in an input sequence used to train the neural network model, a text section corresponding to the multi-character perspective between two text sections corresponding to the single-character perspective.

13. The method as recited in claim 11, further comprising performing, by the one or more computing devices:
in accordance with the order, including, in an input sequence used to train the neural network model, a plurality of text sections corresponding to the single-character perspective, followed by a plurality of text sections corresponding to the multi-character perspective.

14. The method as recited in claim 6, further comprising performing, by the one or more computing devices:
identifying, from among a plurality of execution platforms of a provider network, one or more execution platforms to be used to train the neural network model; and
generating, using the trained neural network model, the book recommendation on one or more of: (a) a portable computing device, (b) a phone device, (c) an e-reader device, or (d) a voice-driven automated personal assistant device.

15. The method as recited in claim 6, further comprising performing, by the one or more computing devices:
providing, via a programmatic interface, a natural language representation of a particular descriptor of the one or more learned descriptors.

16. A non-transitory computer-accessible storage medium storing program instructions that when executed on one or more processors cause the one or more processors to:
obtain, from a first text source of a plurality of text sources, a plurality of text sections, wherein individual ones of the sections are associated with a particular perspective of a plurality of content description perspectives, wherein the plurality of content description perspectives include a single-character perspective and a multi-character perspective, wherein an individual text section associated with a first single-character perspective comprises mentions of one character, and wherein an individual text section associated with a first multi-character perspective comprise mentions of multiple characters;
train, using at least the plurality of text sections as input, a machine learning model comprising at least (a) a single-character perspective portion including a first set of weights and (b) a multi-character perspective portion including a second set of weights, wherein the machine learning model produces, using one or more learned descriptors, a respective reconstructed text section as output corresponding to an input text section; and
transmit an indication that a second text source is recommended with respect to the first text source, wherein the recommendation is generated based at least in part on one or more descriptors learned by the trained machine learning model.

17. The non-transitory computer-accessible storage medium as recited in claim 16, wherein the machine learning model comprises a neural network model with one or more recurrent links.

18. The non-transitory computer-accessible storage medium as recited in claim 16, wherein the instruction when executed on the one or more processors cause the one or more processors to:
generate, based on an analysis of the one or more learned descriptors, a natural language explanation for the recommendation of the second text source with respect to the first text source; and
transmit the natural language explanation.

19. The non-transitory computer-accessible storage medium as recited in claim 18, wherein the analysis of a particular learned descriptor of the one or more learned descriptor comprises determining a distance between a point representing the particular learned descriptor in vector space and another point in the vector space, wherein the other point represents a word from a dictionary.

20. The non-transitory computer-accessible storage medium as recited in claim 16, wherein the instruction when executed on the one or more processors cause the one or more processors to:
utilize a hinge loss function to train the machine learning model.

* * * * *